United States Patent
Haraguchi

(10) Patent No.: US 9,553,474 B2
(45) Date of Patent: Jan. 24, 2017

(54) POWER SUPPLY APPARATUS, IMAGE FORMING APPARATUS, POWER SUPPLY METHOD, AND STORAGE MEDIUM

(71) Applicant: CANON KABUSHIKI KAISHA, Tokyo (JP)

(72) Inventor: Takahiro Haraguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 14/172,747

(22) Filed: Feb. 4, 2014

(65) Prior Publication Data

US 2014/0223204 A1    Aug. 7, 2014

(30) Foreign Application Priority Data

Feb. 6, 2013  (JP) ................................. 2013-021521

(51) Int. Cl.
    *G06F 1/26*     (2006.01)
    *H02J 7/02*     (2016.01)
    *H02J 7/00*     (2006.01)
    *H02J 17/00*     (2006.01)

(52) U.S. Cl.
    CPC ................. *H02J 7/025* (2013.01); *G06F 1/26* (2013.01); *H02J 7/0027* (2013.01); *H02J 17/00* (2013.01); *H02J 2007/0096* (2013.01)

(58) Field of Classification Search
CPC ........... H02J 7/00; H02J 7/0027; H02J 7/0025
USPC ......................................................... 713/300
See application file for complete search history.

(56) References Cited

U.S. PATENT DOCUMENTS

| | | | | |
|---|---|---|---|---|
| 5,808,442 A | * | 9/1998 | Kaite ................. | H01M 10/441 320/106 |
| 2008/0222431 A1 | * | 9/2008 | Paniagua ................. | G06F 1/26 713/300 |
| 2008/0258679 A1 | * | 10/2008 | Manico ................... | H02J 7/025 320/106 |
| 2011/0175576 A1 | * | 7/2011 | Uesaka ................. | H01M 10/44 320/155 |
| 2011/0234156 A1 | * | 9/2011 | Fujita .................... | H02J 7/0027 320/108 |
| 2012/0249054 A1 | * | 10/2012 | King ..................... | H02J 7/0003 320/107 |

(Continued)

FOREIGN PATENT DOCUMENTS

JP    2003-224937 A    8/2003
JP    2007-089341 A    4/2007

(Continued)

*Primary Examiner* — Vincent Tran
(74) *Attorney, Agent, or Firm* — Canon U.S.A., Inc. IP Division

(57) ABSTRACT

A power supply apparatus includes a charging mode information receiving unit configured to receive, from each of a plurality of power receiving apparatuses each including a secondary battery, charging mode information indicating whether each of the power receiving apparatuses requests normal charging of the secondary battery or fast charging of the secondary battery, wherein the fast charging charges faster than the normal charging, a power supply order determination unit configured to determine a power supply order of the power receiving apparatuses based on the charging mode information, and a power supply unit configured to wirelessly supply power to the power receiving apparatuses in the order determined by the power supply order determination unit.

7 Claims, 19 Drawing Sheets

| SERIAL NUMBER | POWER RECEIVING APPARATUS ID | REMAINING BATTERY CAPACITY | CHARGING MODE | POWER TRANSFER PERIOD FOR POWER RECEIVING APPARATUS |
|---|---|---|---|---|
| 1 | AA | 90% | 0 | 60 SECONDS |
| 2 | BB | 80% | 0 | 60 SECONDS |
| 3 | CC | 70% | 0 | 60 SECONDS |
| 4 | DD | 50% | 1 | 300 SECONDS |
| 5 | EE | 20% | 1 | 300 SECONDS |
| 6 | KK | 30% | 0 | 60 SECONDS |
| 7 | GG | 40% | 0 | 60 SECONDS |
| 8 | HH | 10% | 0 | 60 SECONDS |
| 9 | JJ | 40% | 1 | 300 SECONDS |

(columns: 8000, 8010, 8020, 8030, 8040)

(56) References Cited

U.S. PATENT DOCUMENTS

| | | | | |
|---|---|---|---|---|
| 2012/0280650 A1* | 11/2012 | Kim | ........................ | H02J 17/00 |
| | | | | 320/108 |
| 2013/0154554 A1* | 6/2013 | Sakai | ...................... | H02J 7/025 |
| | | | | 320/108 |
| 2013/0234661 A1* | 9/2013 | Yang | ....................... | H02J 7/025 |
| | | | | 320/108 |
| 2013/0260677 A1* | 10/2013 | Partovi | ................... | H01F 5/003 |
| | | | | 455/41.1 |
| 2013/0271088 A1* | 10/2013 | Hwang | .................... | H02J 4/00 |
| | | | | 320/155 |
| 2014/0008990 A1* | 1/2014 | Yoon | ....................... | H02J 5/005 |
| | | | | 307/104 |
| 2014/0035380 A1* | 2/2014 | Stevens | ................... | H02J 5/005 |
| | | | | 307/104 |
| 2014/0361732 A1* | 12/2014 | Nishikawa | ............ | H02J 7/0014 |
| | | | | 320/107 |
| 2015/0171931 A1* | 6/2015 | Won | ........................ | H02J 5/005 |
| | | | | 320/108 |

FOREIGN PATENT DOCUMENTS

| | | |
|---|---|---|
| JP | 2009-186908 A | 8/2009 |
| JP | 2010-525785 A | 7/2010 |
| JP | 2011-205788 A | 10/2011 |
| JP | 2012-070565 A | 4/2012 |
| JP | 2012-143042 A | 7/2012 |
| JP | 2012-518981 A | 8/2012 |
| WO | 2012-081858 A2 | 6/2012 |

* cited by examiner

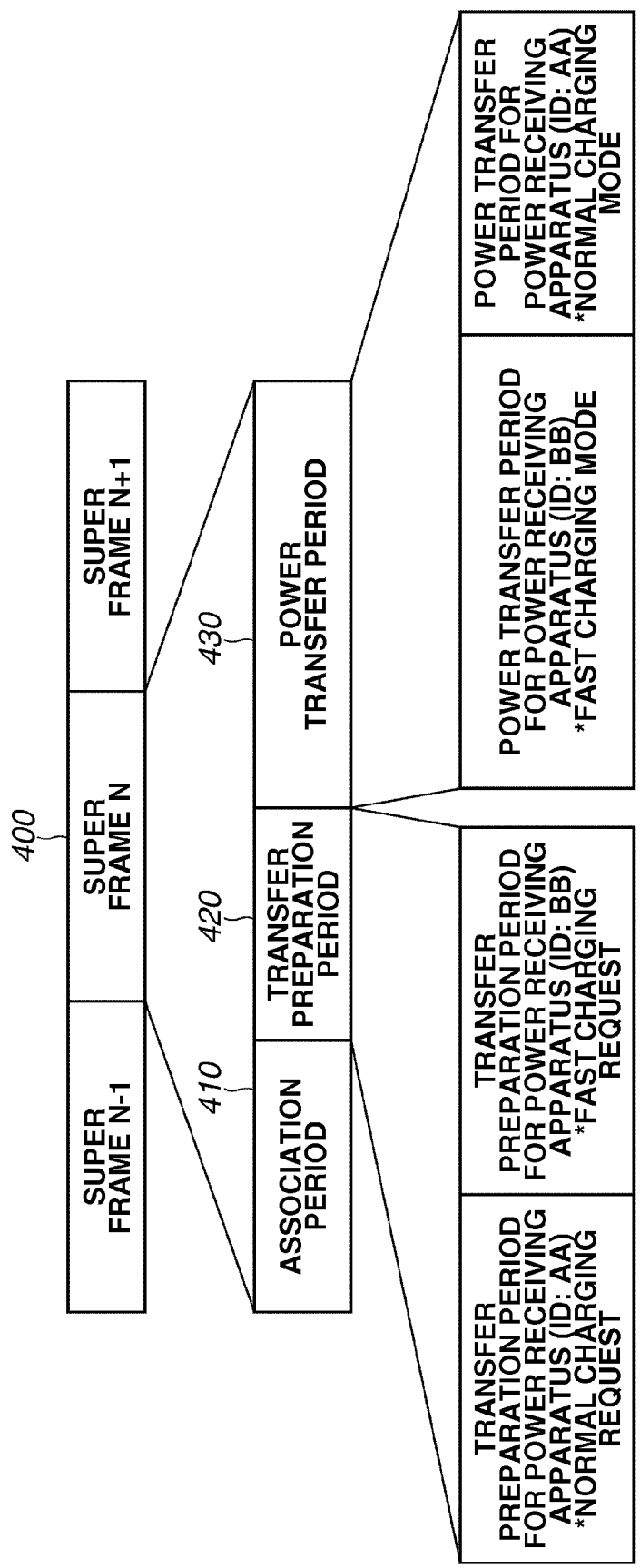

FIG.6A

| FRAME HEADER 510 | | | | | FRAME BODY 520 | | |
|---|---|---|---|---|---|---|---|
| ID | FRAME CONTROL | SOURCE ADDRESS | DESTINATION ADDRESS | SEQUENCE NUMBER | PAYLOAD | | FRAME CHECK SEQUENCE |
| | | | | | POWER RECEIVING APPARATUS ID | REMAINING BATTERY CAPACITY | CHARGING MODE (0: NORMAL/1: FAST) | |
| 511 | 512 | 513 | 514 | 515 | 530 | 540 | 550 | 521 | 522 |

FIG.6B

| FRAME HEADER 510 | | | | | FRAME BODY 520 | | | | |
|---|---|---|---|---|---|---|---|---|---|
| ID | FRAME CONTROL | SOURCE ADDRESS | DESTINATION ADDRESS | SEQUENCE NUMBER | PAYLOAD | | | | FRAME CHECK SEQUENCE |
| | | | | | POWER RECEIVING APPARATUS ID | REMAINING BATTERY CAPACITY | CHARGING MODE (0: NORMAL/1: FAST) | FAST CHARGING PERMISSION (0: NOT PERMITTED/ 1: PERMITTED) | |
| 511 | 512 | 513 | 514 | 515 | 530 | 540 | 550 | 660 | 521 | 522 |

FIG.7

| SERIAL NUMBER | POWER RECEIVING APPARATUS ID | REMAINING BATTERY CAPACITY | CHARGING MODE | POWER TRANSFER PERIOD FOR POWER RECEIVING APPARATUS |
|---|---|---|---|---|
| 1 | AA | 90% | 0 | 60 SECONDS |
| 2 | BB | 80% | 0 | 60 SECONDS |
| 3 | CC | 70% | 0 | 60 SECONDS |
| 4 | DD | 50% | 1 | 300 SECONDS |
| 5 | EE | 20% | 1 | 300 SECONDS |
| 6 | KK | 30% | 0 | 60 SECONDS |
| 7 | GG | 40% | 0 | 60 SECONDS |
| 8 | HH | 10% | 0 | 60 SECONDS |
| 9 | JJ | 40% | 1 | 300 SECONDS |

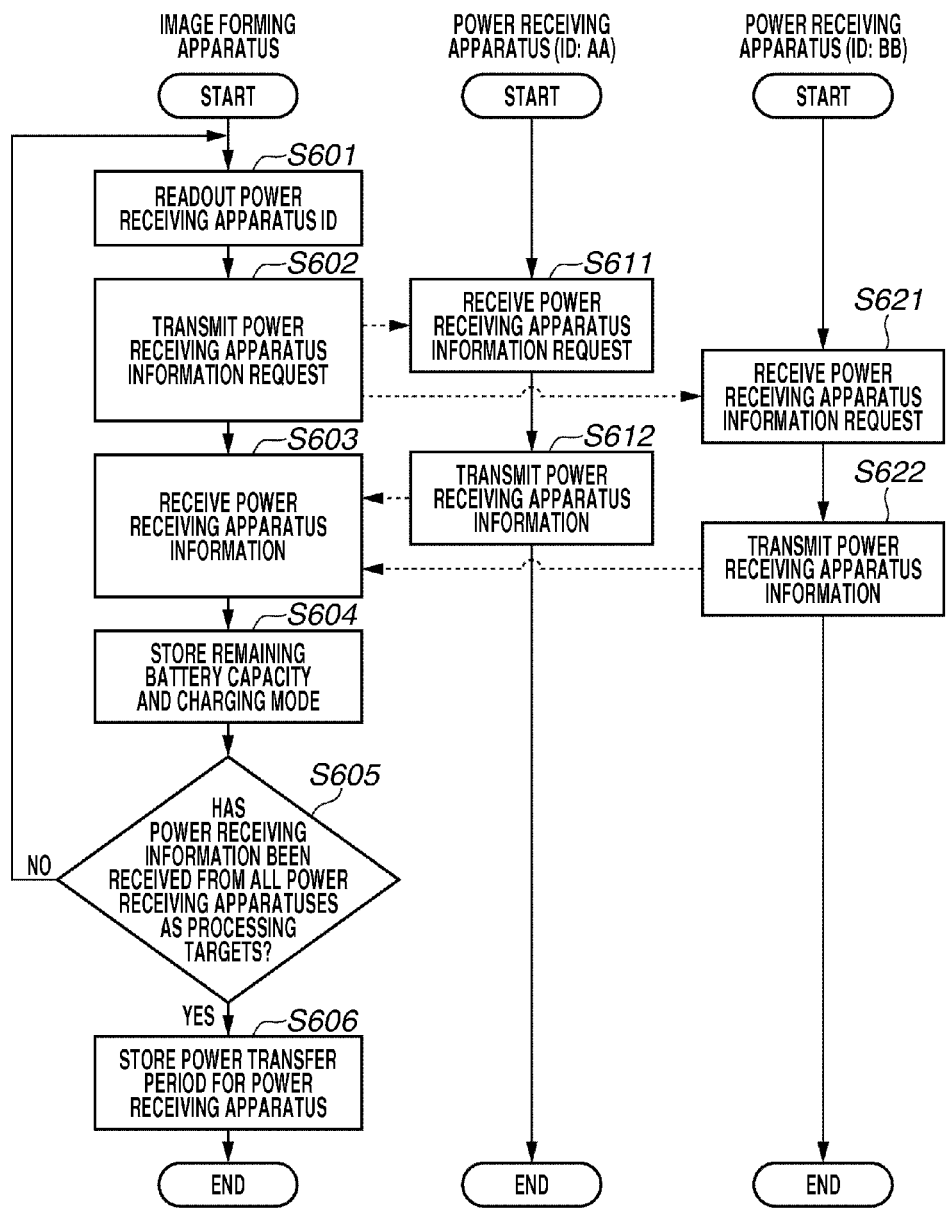

FIG.10

| SERIAL NUMBER | POWER RECEIVING APPARATUS ID | REMAINING BATTERY CAPACITY | CHARGING MODE | POWER TRANSFER PERIOD FOR POWER RECEIVING APPARATUS | SKIP |
|---|---|---|---|---|---|
| 1 | HH | 10% | 0 | 60 SECONDS | NO |
| 2 | EE | 20% | 1 | 300 SECONDS | NO |
| 3 | KK | 30% | 0 | 60 SECONDS | NO |
| 4 | GG | 40% | 0 | 60 SECONDS | NO |
| 5 | JJ | 40% | 1 | 300 SECONDS | YES |
| 6 | DD | 50% | 1 | 300 SECONDS | YES |
| 7 | CC | 70% | 0 | 60 SECONDS | NO |
| 8 | BB | 80% | 0 | 60 SECONDS | NO |
| 9 | AA | 90% | 0 | 60 SECONDS | YES |

POWER SUPPLY APPARATUS, IMAGE FORMING APPARATUS, POWER SUPPLY METHOD, AND STORAGE MEDIUM

BACKGROUND OF THE INVENTION

Field of the Invention

The present invention relates to a power supply apparatus, an image forming apparatus, a power supply method, and a storage medium.

Description of the Related Art

Power supply systems that charge a battery in a contact-less manner (wirelessly) have conventionally been known. Such a wireless power supply system can charge a battery of a mobile terminal such as a cell-phone and a smartphone by supplying power to the battery.

Furthermore, contact power supply systems have been known that have two charging modes of normal charging and fast charging completed faster than the normal charging. For example, a system is discussed in Japanese Patent Application Laid-Open No. 2009-186908 in which power is supplied to a power receiving apparatus including two batteries. One of the batteries is charged by the fast charging and the other one of the batteries is charged by the normal charging. The charging mode is switched between the normal charging and the fast charging in accordance with the remaining battery capacities of the batteries.

In the wireless charging system, power is supplied to a plurality of power receiving apparatuses in some cases. Here, the power receiving apparatuses as the power supply targets might request the normal charging mode or the fast charging mode independently from each other. Therefore, a technique of appropriately supplying power to the power receiving apparatuses in such a situation has been called for.

SUMMARY OF THE INVENTION

The present invention provides a system that can appropriately supply power to a plurality of power receiving apparatuses requesting different charging modes.

According to an aspect of the present invention, a power supply apparatus includes a charging mode information receiving unit configured to receive, from each of a plurality of power receiving apparatuses each including a secondary battery, charging mode information indicating whether each of the power receiving apparatuses requests normal charging of the secondary battery or fast charging of the secondary battery, wherein the fast charging charges faster than the normal charging, a power supply order determination unit configured to determine a power supply order of the power receiving apparatuses based on the charging mode information, and a power supply unit configured to wirelessly supply power to the power receiving apparatuses in the order determined by the power supply order determination unit.

Further features of the present invention will become apparent from the following description of exemplary embodiments with reference to the attached drawings.

BRIEF DESCRIPTION OF THE DRAWINGS

FIG. 5 is a diagram illustrating super frames.

FIGS. 6A and 6B are diagrams respectively illustrating an example of a frame format.

FIG. 7 is a diagram illustrating an example of a power receiving apparatus information table.

FIG. 9 is a flowchart illustrating processing in a transfer preparation period.

FIG. 10 is a diagram illustrating an example of a power supply order table.

DESCRIPTION OF THE EMBODIMENTS

Various exemplary embodiments, features, and aspects of the invention will be described in detail below with reference to the drawings.

Figure 1:
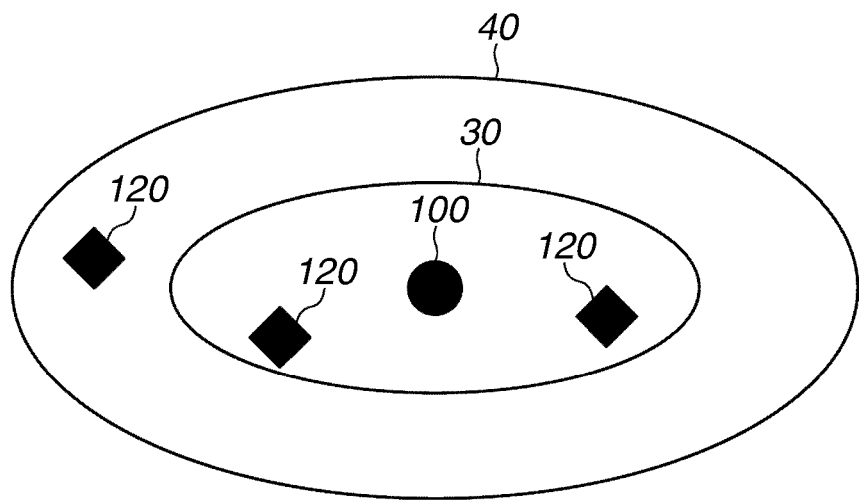
FIG. 1 is a diagram illustrating a wireless power supply system.

FIG. 1 illustrates a wireless power supply system including an image forming apparatus 100 as a power supply apparatus and power receiving apparatuses 120. The power receiving apparatus 120 is, for example, a mobile terminal such as a smartphone or a cell-phone. In FIG. 1, three power receiving apparatuses 120 are illustrated, but the number of the power receiving apparatuses 120 is not limited to that in the exemplary embodiment.

The image forming apparatus 100 wirelessly transfers power to the power receiving apparatuses 120. The image forming apparatus 100 performs data communications required for the power supply with the power receiving apparatuses 120. The power receiving apparatus 120 wirelessly receives the power from the image forming apparatus 100. The power receiving apparatus 120 performs the data communications required for the power supply with the image forming apparatus 100.

A power supply area 30 is an area in which the power supply from the image forming apparatus 100 to the power receiving apparatuses 120 can be performed. The size of the power supply area 30 depends on the power supply capacity of the image forming apparatus 100. If a plurality of the power receiving apparatuses 120 exists in the power supply area 30 as illustrated in FIG. 1, the image forming apparatus 100 can wirelessly supply power to each of the power receiving apparatuses 120.

A communication area 40 is an area in which data communications between the image forming apparatus 100 and the power receiving apparatus 120 can be performed. The communication area 40 is larger than the power supply area 30, and includes the power supply area 30.

Figure 2:
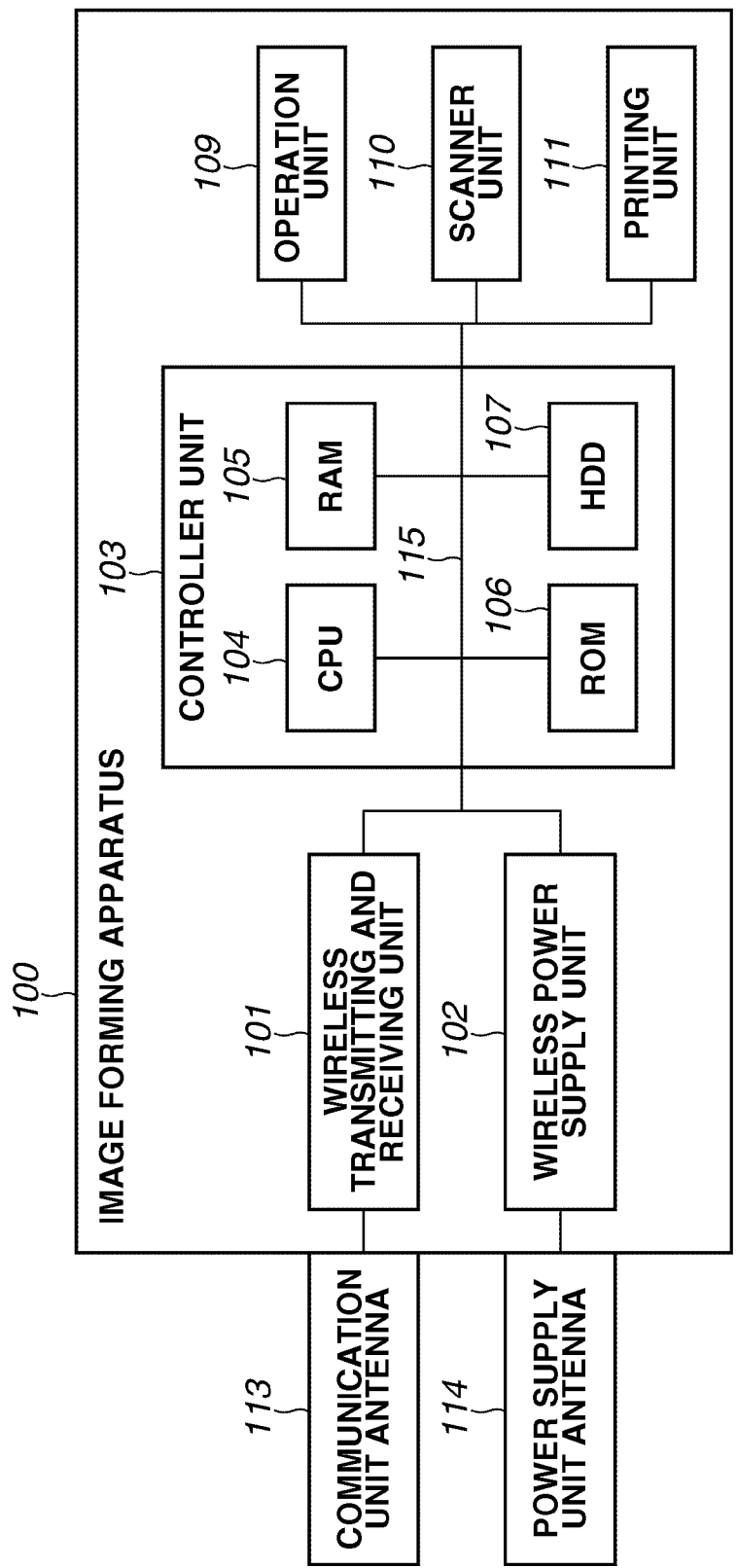
FIG. 2 is a diagram illustrating an image forming apparatus.

FIG. 2 is a diagram illustrating the image forming apparatus 100 including a controller unit 103, a wireless transmitting and receiving unit 101, a wireless power supply unit 102, an operation unit 109, a scanner unit 110, a printing unit 111, a communication unit antenna 113, and a power supply unit antenna 114. The controller unit 103 is connected to the scanner unit 110 serving as an image input device, the printing unit 111 serving as an image output device, and the operation unit 109 serving as a user interface (IF) through a bus. The controller unit 103 is connected to the wireless transmitting and receiving unit 101 and the wireless power supply unit 102 through a bus 115. The controller unit 103 includes a central processing unit (CPU) 104, a random access memory (RAM) 105, a read only memory (ROM) 106, and a hard disk drive (HDD) 107.

The RAM 105 is a work memory and stores therein power receiving apparatus information. The power receiving apparatus information includes identification (ID) information of the power receiving apparatus 120, information on remaining battery capacity of a secondary battery 270 of the power receiving apparatus 120, and the like. The power receiving apparatus information is received by the wireless transmitting and receiving unit 101 from the power receiving apparatus 120, and stored in the RAM 105 by the CPU 104. The RAM 105 further stores therein information such as a setting value of a power transfer period and power supply order information. Such information is stored in the RAM 105 by the CPU 104.

The ROM 106 stores therein a control program for the CPU 104. The HDD 107 temporarily stores therein image data input from the scanner unit 110. The CPU 104 operates in accordance with the program stored in the ROM 106 to control the image forming apparatus 100.

The functions and processing of the image forming apparatus 100 to be described below are realized as the CPU 104 reads out and executes the program stored in the ROM 106 or the HDD 107.

The printing unit 111 forms a latent image in accordance with the image data output from the controller unit 103 and transfers the latent image onto a sheet of paper. The scanner unit 110 scans and computerizes the image printed on the sheet of paper to output the resultant data to the controller unit 103. The operation unit 109 is a user IF that receives from a user, setting inputs such as setting of the image forming apparatus 100, an operation instruction to the image forming apparatus 100, the power transfer period as a unit of time during which the power is supplied to the power receiving apparatus 120, and a power supply order of the power receiving apparatuses 120. The operation unit 109 includes a display unit 910 on which various pieces of information are displayed.

The wireless transmitting and receiving unit 101 modulates/demodulates a radio signal transmitted/received through the communication unit antenna 113. The wireless transmitting and receiving unit 101 is coupled to the CPU 104 through the bus 115, and is controlled by the CPU 104. Through the communication unit antenna 113 and the wireless transmitting and receiving unit 101, the image forming apparatus 100 receives the power receiving apparatus information or the print data from the power receiving apparatus 120, and transmits a power supply instruction to the power receiving apparatus 120.

The CPU 104 processes the power receiving apparatus information acquired from the power receiving apparatus 120 in accordance with the program stored in the ROM 106, and records the resultant information in the RAM 105. Similarly, the CPU 104 processes the print data received from the power receiving apparatus 120 in accordance with the program stored in the ROM 106, and records the resultant data in the HDD 107 or outputs the data to the printing unit 111.

The wireless power supply unit 102 is a power supply unit that supplies power to the power receiving apparatus 120 in a contactless manner. The wireless power supply unit 102 is connected to the power supply unit antenna 114 and supplies electrical energy to the power receiving unit 120 through the power supply unit antenna 114. The CPU 104 is in charge of the output control of the wireless power supply unit 102.

Figure 3:
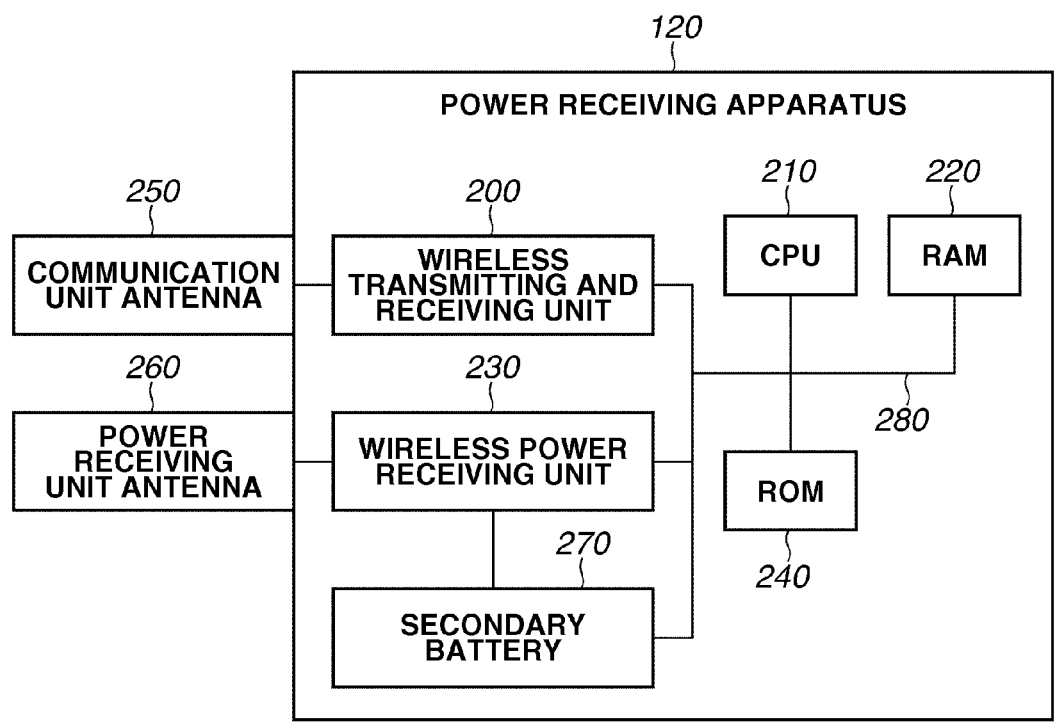
FIG. 3 is a diagram illustrating a power receiving apparatus.

FIG. 3 is a diagram illustrating the power receiving unit 120 including a CPU 210, a RAM 220, a ROM 240, a wireless transmitting and receiving unit 200, a wireless power receiving unit 230, a communication unit antenna 250, a power receiving unit antenna 260, and the secondary battery 270 that are mutually connected through a bus 280.

The CPU 210 controls the power receiving apparatus 120 in accordance with a control program stored in the ROM 240. The RAM 220 is a work memory for the CPU 210 to perform processing. The ROM 240 stores therein a control program for the CPU 210 and power receiving apparatus IDs unique to the respective power receiving apparatuses 120 for identifying the power receiving apparatuses 120.

The functions and processing of the power receiving apparatus 120 described below are realized as the CPU 210 reads out and executes the program stored in the ROM 240.

The wireless transmitting and receiving unit 200 is an IF that communicates with the image forming apparatus 100 through the communication unit antenna 250. The wireless power receiving unit 230 receives power supplied from the wireless power supply unit 102 of the image forming apparatus 100 through the power receiving unit antenna 260. The power received by the wireless power receiving unit 230 is used for charging the secondary battery 270. The secondary battery 270 supplies power to the CPU 210, the RAM 220, the ROM 240, the wireless transmitting and receiving unit 200, and the wireless power receiving unit 230 of the power receiving apparatus 120.

Figure 4:
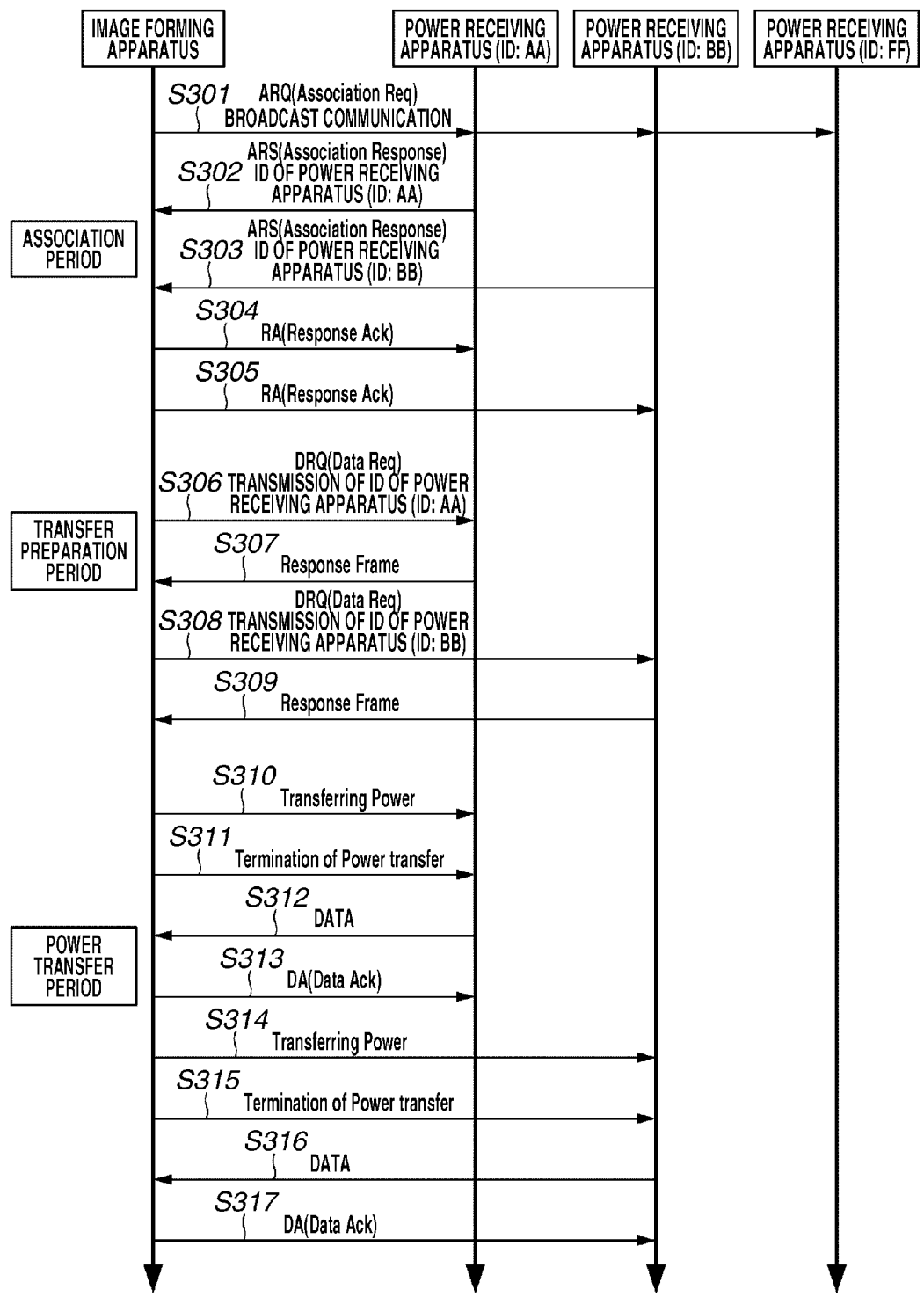
FIG. 4 is a sequence diagram illustrating power supply processing.

FIG. 4 is a sequence diagram illustrating power supply processing in the wireless power supply system where the image forming apparatus 100 supplies power to the power receiving apparatuses 120. FIG. 4 exemplarily illustrates a case where three power receiving apparatuses 120 with the respective power receiving apparatus IDs "AA", "BB", and "FF" are in the communication area 40.

In FIG. 4, a case is described where processing proceeds under a condition that the image forming apparatus 100 determines to supply power to the power receiving apparatuses 120 with the power receiving apparatus IDs "AA" and "BB", and determines not to wirelessly supply power to the power receiving apparatus 120 with the power receiving apparatus ID "FF".

The power supply processing is roughly divided into processing in an association period, processing in a transfer preparation period, and processing in a power transfer period. In the wireless power supply system, a series of processing steps is defined as a single frame, and the power is supplied through repeating the frame. Each processing step is described in detail below.

<Association Period>

In association request (ARQ) processing in step S301, the CPU 104 of the image forming apparatus 100 issues a communication command to the wireless transmitting and receiving unit 101 through the bus 115. The wireless transmitting and receiving unit 101 performs broadcast communications with each power receiving apparatus 120 to notify the power receiving apparatus 120 of a power supply start.

In association response (ARS) processing in steps S302 and S303, the power receiving apparatus 120 that requests power supply transmits own power receiving apparatus ID to the image forming apparatus 100. Thus, the wireless transmitting and receiving unit 101 of the image forming apparatus 100 receives the power receiving apparatus ID. The CPU 104 of the image forming apparatus 100 acquires the power receiving apparatus ID from the wireless transmitting and receiving unit 101 through the bus 115, and uses the power receiving apparatus ID to detect the power receiving apparatus 120 requesting the power supply.

In the example illustrated in FIG. 4, each of the power receiving apparatuses 120 with the power receiving apparatus IDs "AA" and "BB" transmits the own power receiving apparatus ID to the image forming apparatus 100. The power receiving apparatus 120 with the power receiving apparatus ID "FF" does not transmit the own power receiving apparatus ID.

As a result, the processing in the transfer preparation period and the power transfer period described below is performed between the image forming apparatus 100 and the power receiving apparatuses 120 with the power receiving apparatus IDs "AA" and "BB". The processing in the transfer preparation period and the power transfer period are not performed between the image forming apparatus 100 and the power receiving apparatus 120 with the power receiving apparatus ID "FF".

Then, the CPU 104 of the image forming apparatus 100 performs response acknowledgement (RA) processing in steps S304 and S305. Specifically, the wireless transmitting and receiving unit 101 of the image forming apparatus 100 returns to the power receiving apparatus 120 as the power supply target, the power receiving apparatus ID thereof under the control of the CPU 104. Thus, the CPU 104 notifies the power receiving apparatus 120 of the acknowledgement of the power supply.

<Transfer Preparation Period>

The CPU 104 of the image forming apparatus 100 performs data request (DRQ) processing in steps S306 and S308. Specifically, under the control of the CPU 104, the wireless transmitting and receiving unit 101 of the image forming apparatus 100 transmits to the power receiving apparatuses 120 as the power supply targets, power receiving apparatus information requests together with the respective power receiving apparatus IDs.

The power receiving apparatus 120 that has received the power receiving apparatus information request transmits the power receiving apparatus information to the image forming apparatus 100 in response frame processing in steps S307 and S309. The wireless transmitting and receiving unit 101 of the image forming apparatus 100 receives the power receiving apparatus information. The CPU 104 of the image forming apparatus 100 acquires the power receiving apparatus information from the wireless transmitting and receiving unit 101 through the bus 115, and stores the power receiving apparatus information thus acquired in the RAM 105.

<Power Transfer Period>

The CPU 104 of the image forming apparatus 100 issues a command indicating a power supply time and power supply start in transferring power processing in steps S310 and S314. The wireless power supply unit 102 starts the power supply in accordance with the command.

When the power supply time is over, the wireless power supply unit 102 of the image forming apparatus 100 terminates the power supply in termination of power transfer processing in steps S311 and S315. Upon terminating the power supply, the wireless power supply unit 102 transmits a power supply termination notification to the CPU 104 through the bus 115. The wireless transmitting and receiving unit 101 transmits the power supply termination notification to the power receiving apparatuses 120 to which the power has been supplied.

The power receiving apparatuses 120 that have received the power supply termination notification transmit the power receiving processing termination notification to the image forming apparatus 100 in data processing in steps S312 and 316 upon appropriately terminating power receiving processing. The wireless transmitting and receiving unit 101 of the image forming apparatus 100 receives the power receiving processing termination notification from the power receiving apparatuses 120. The CPU 104 of the image forming apparatus 100 receives the power receiving processing termination notification from the wireless transmitting and receiving unit 101 through the bus 115.

Under the control of the CPU 104, the wireless transmitting and receiving unit 101 of the image forming apparatus 100 transmits, to each of the power receiving apparatuses 120, an acknowledgement notification indicating that the power receiving processing termination notification has been received in data acknowledgement (DA) processing in steps S313 and S317.

The CPU 104 of the image forming apparatus 100 can acquire various pieces of information from the power receiving apparatuses 120 as the power supply targets. The information is acquired at a predetermined timing in the power transfer period through a communication from the wireless transmitting and receiving unit 101. Thus, the CPU 104 can appropriately execute processing (steps S312, S316, S313, and S317) of receiving power supply data from the power receiving apparatus 120 once the operations in steps S310 and S314 are completed. Accordingly, if the power receiving apparatus 120 encounters an unexpected circumstance for example, the image forming apparatus 100 can stop the power supply in response to a request from the power receiving apparatus 120.

FIG. 5 is a diagram illustrating a sequence of super frames. A single frame includes the association period (steps S301 to S305), the transfer preparation period (steps S306 to S309), and the power transfer period (step S310 to S317) described with reference to FIG. 4. Specifically, a super frame N400 includes an association period 410, a transfer preparation period 420, and a power transfer period 430. Each super frame has a variable time length.

In the association period 410, the CPU 104 performs the processing in the association period (steps S301 to S305), and receives the power receiving apparatus ID from the power receiving apparatus 120 requesting the power supply. The processing in the association period is described below with reference to FIG. 8.

In the transfer preparation period 420, the CPU 104 performs the processing in the transfer preparation period (steps S306 to S309), and receives the power receiving apparatus information from the power receiving apparatuses 120 requesting the power supply. If more than one power receiving apparatuses 120 are requesting the power supply, the CPU 104 receives the power receiving apparatus information from each of the power receiving apparatuses 120. The processing in the transfer preparation period 420 will be described below with reference to FIG. 9.

In the power transfer period 430, the CPU 104 performs the processing in the power transfer period (steps S310 to S317), and supplies power to the power receiving apparatuses 120 requesting the power supply. The processing in the power transfer period 430 will be described below with reference to FIG. 12.

The super frame N400 illustrated in FIG. 5 represents a case where the two power receiving apparatuses 120 with the power receiving IDs "AA" and "BB" have requested the power supply. Thus, in the transfer preparation period 420, the image forming apparatus 100 performs the transfer preparation processing with each of the two power receiving apparatuses 120 with the power receiving IDs "AA" and "BB". In the power transfer period 430, the image forming apparatus 100 performs the power transfer processing to each of the two power receiving apparatuses 120 with the power receiving IDs "AA" and "BB".

In the example illustrated in FIG. 5, the image forming apparatus 100 first performs the power transfer processing to the power receiving apparatus 120 with the power receiving apparatus ID "BB", and then performs the power transfer processing to the power receiving apparatus 120 with the power receiving apparatus ID "AA". How the image forming apparatus 100 determines the order of the power receiving apparatuses 120 to which the power transfer is performed will be described below. As described above, the image forming apparatus 100 according to this exemplary embodiment can supply power to a plurality of the power receiving apparatuses 120 in the power transfer period 430 in a single frame.

FIGS. 6A and 6B are diagrams respectively illustrating an example of a frame format of the information transmitted and received between the image forming apparatus 100 and the power receiving apparatus 120. The data communications between the image forming apparatus 100 and the power receiving apparatuses 120 are realized with packets having the frame formats illustrated in FIGS. 6A and 6B.

A frame header 510 includes an ID 511, a frame control 512, a source address 513, a destination address 514, and a sequence number 515 and indicates addresses and the like for data transfer. The ID 511 is an ID used for the data communications between the image forming apparatus 100 and the power receiving apparatus 120. The frame control 512 is information used for data exchange between the image forming apparatus 100 and the power receiving apparatus 120. The source address 513 is an address of a source of the data transfer. The destination address 514 is an address of a destination of the data transfer. The sequence number 515 is a number allocated to a frame.

The frame body 520 includes a payload 521 and a frame check sequence 522, and is information of data main body in the data transfer. The payload 521 is the data main body. The frame check sequence 522 is data for checking an error of the payload 521.

The payload 521 is allocated with various pieces of information. For example, the payload 521 in a packet transmitted to the image forming apparatus 100 from the power receiving apparatus 120 is allocated with a power receiving apparatus ID 530, a remaining battery capacity 540, and a charging mode 550 as illustrated in FIG. 6A.

The payload 521 in a packet transmitted in an operation in step S726 in FIG. 12 described below is allocated with an interruption request. The payload 521 in a packet transmitted to the power receiving apparatus 120 from the image forming apparatus 100 is allocated with a power receiving apparatus ID 530, a remaining battery capacity 540, a charging mode 550, and a fast charging permission 660 as illustrated in FIG. 6B.

The payload 521 in a packet transmitted in an operation in step S703 in FIG. 12 described below is allocated with a power supply start command. The payload 521 in a packet transmitted in an operation in step S706 in FIG. 12 described below is allocated with a power supply termination notification.

The power receiving apparatus ID 530 is a unique number for distinguishing the power receiving apparatuses 120. The remaining battery capacity 540 indicates the remaining battery capacity of the secondary battery 270 of the power receiving apparatus 120. The charging mode 550 is a flag used by the power receiving apparatus 120 to notify the image forming apparatus 100 of a requesting charging mode (fast charging or normal charging). The fast charging is completed faster than the normal charging. The power receiving apparatus 120 sets "1" to the charge mode 550 and transmits the packet to the image forming apparatus 100 for requesting the fast charging. The power receiving apparatus 120 sets "0" to the charge mode 550 and transmits the packet to the image forming apparatus 100 for requesting the normal charging.

The image forming apparatus 100 of the exemplary embodiment allocates the power receiving apparatus 120 requesting the fast charging with a charging time (power transfer period) longer than that allocated to the power receiving apparatus 120 requesting the normal charging. By thus setting a longer time, the image forming apparatus 100 can complete the requested fast charging that is faster than the normal charging.

The fast charging permission 660 is a flag used by the image forming apparatus 100 to notify the power receiving apparatus 120 whether the fast charging is permitted. When permitting the fast charging to the power receiving apparatus 120 requesting the fast charging, the image forming apparatus 100 makes the CPU 104 set "1" to the fast charging permission 660 and transmits the packet to the power receiving apparatus 120. When not permitting the fast charging to the power receiving apparatus 120 requesting the fast charging, the image forming apparatus 100 makes the CPU 104 set "0" to the fast charging permission 660 and transmits the packet to the power receiving apparatus 120.

Now, how the image forming apparatus 100 determines whether to permit the fast charging will be described. For example, the power receiving apparatus 120 requesting the fast charging detected every time in the association period 410 is likely to be fixed in the power supply area 30. Thus, in such a case, the image forming apparatus 100 determines not to permit the fast charging to the power receiving apparatus 120 detected every time. Here, the image forming apparatus 100 stores a threshold value of a detected number of times in the ROM 106 and the like in advance. Thus, the CPU 104 of the image forming apparatus 100 determines not to permit the fast charging to the power receiving apparatus 120 consecutively detected for the number of times equal to or larger than the threshold value of the detected number of times.

Alternatively, the image forming apparatus 100 may store a threshold value of a remaining battery capacity of each power receiving apparatus 120 in the ROM 106 and the like in advance. Thus, the CPU 104 of the image forming apparatus 100 may determine not to permit the fast charging to the power receiving apparatus 120 indicating the remaining battery capacity equal to or larger than the threshold value of the remaining battery capacity.

FIG. 7 is a diagram illustrating an example of a data configuration of a power receiving apparatus information table stored in a storage unit such as the ROM 106 of the image forming apparatus 100. The CPU 104 creates the power receiving apparatus information table based on the power receiving apparatus information received from the power receiving apparatus 120. The processing of creating the power receiving apparatus information table will be described below.

The power receiving apparatus information table includes a serial number 8000, a power receiving apparatus ID 8010, a remaining battery capacity 8020, a charging mode 8030, and a power transfer period for power receiving apparatus 8040. The power receiving apparatus information table illustrated in FIG. 7 includes nine records respectively corresponding to the numbers "1" to "9" in the serial number 8000. The serial number 8000 indicates numbers allocated to the power receiving apparatuses 120 in the detected order, that is, in the order in which the power receiving apparatuses 120 have been detected by the image forming apparatus 100. The power receiving apparatus ID 8010 indicates a unique number of each power receiving apparatus 120. The CPU 104 stores the serial number 8000 and the power receiving apparatus ID 8010 in the power receiving apparatus information table in step S504 in FIG. 8.

The remaining battery capacity 8020 indicates the remaining battery capacity of the secondary battery 270 of the power receiving apparatus 120. The charging mode 8030 is a flag indicating the charging mode requested by the power receiving apparatus 120. The charging mode 8030 is set to "0" for the power receiving apparatus 120 requesting the normal charging, and is set to "1" for the power receiving apparatus 120 requesting the fast charging. The charging mode 8030 is a value set in the charging mode 550 in the packet to be transmitted from the power receiving apparatus 120 to the image forming apparatus 100.

The power transfer period for power receiving apparatus 8040 indicates the power transfer period allocated to each power receiving apparatus 120. The power transfer period for power receiving apparatus 8040 is a value determined in accordance with the charging mode of the power receiving apparatus 120. The CPU 104 stores the remaining battery capacity 8020, the charging mode 8030, and the power transfer period for power receiving apparatus 8040 in the power receiving apparatus information table in step S604 in FIG. 9.

Figure 8A:
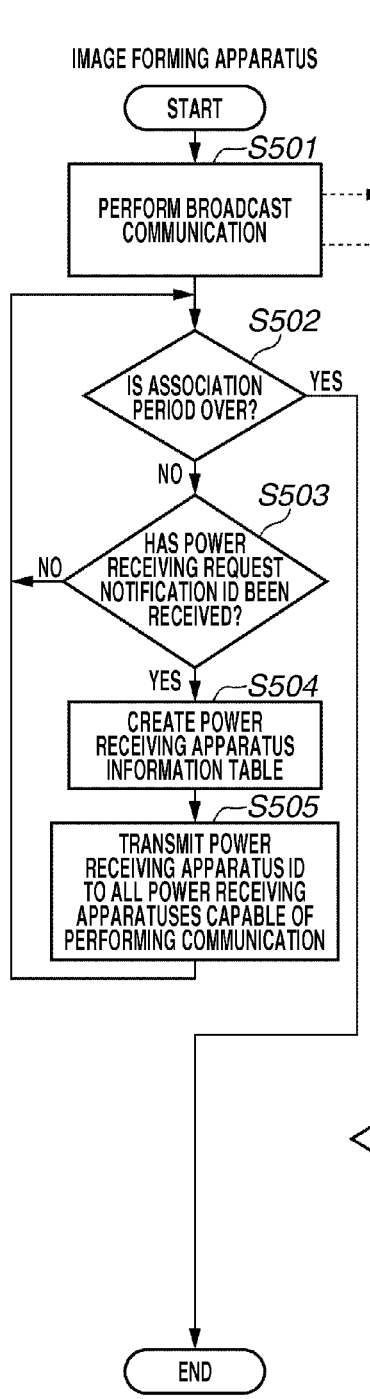
FIG. 8, composed of FIG. 8A and FIG. 8B, is a flowchart illustrating processing in an association period.
Figure 8:
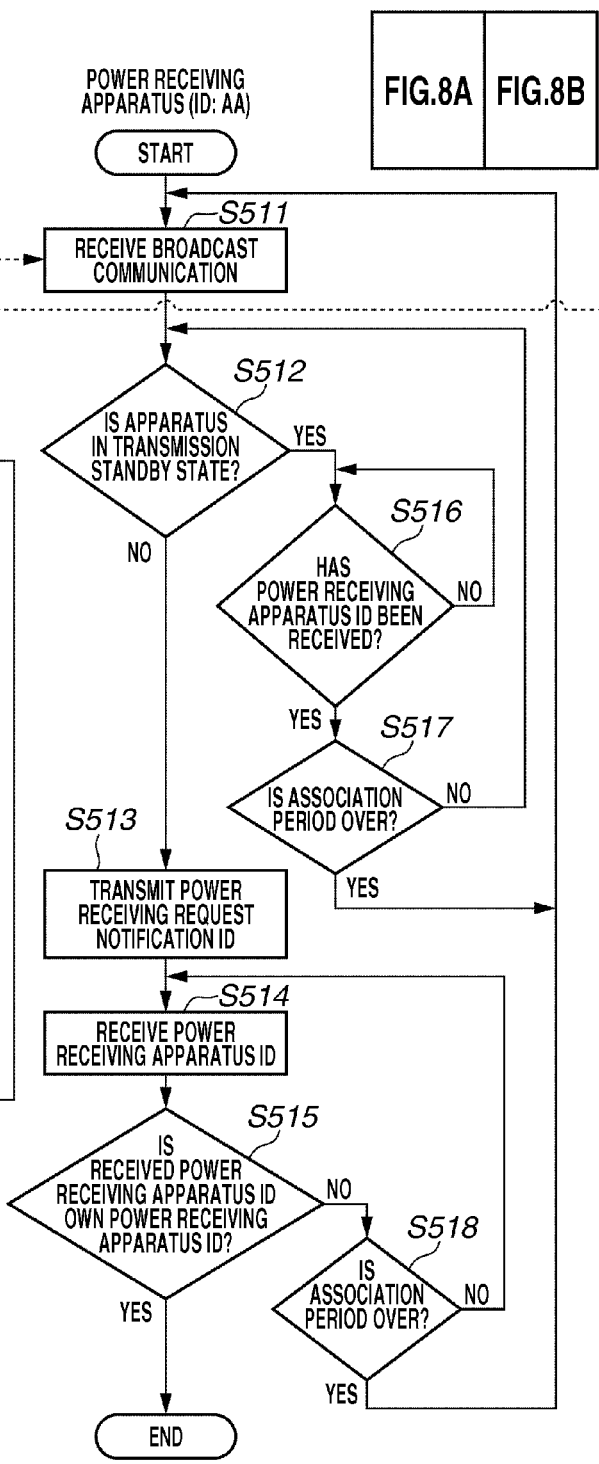
Figure 8B:
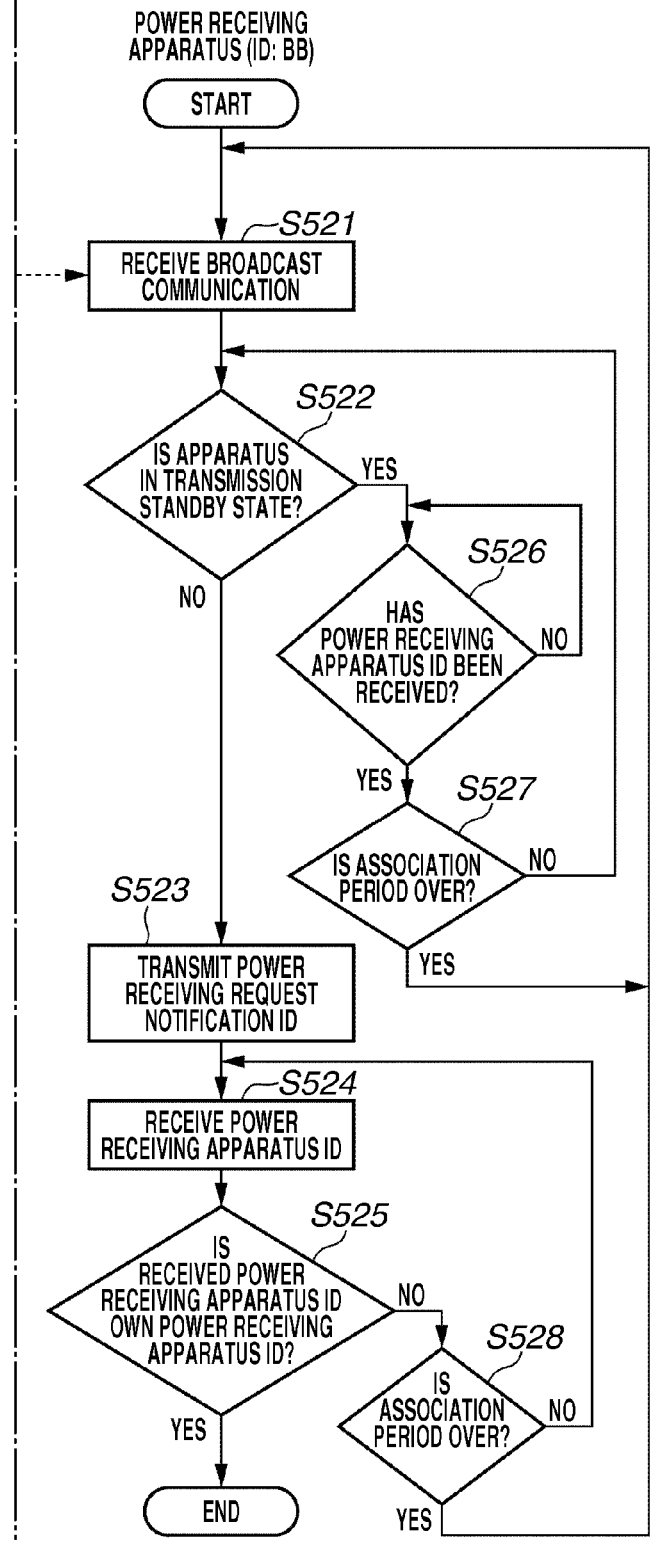

FIG. 8, which is composed of FIGS. 8A and 8B, is a flowchart illustrating the processing in the association period in detail. The processing between the image forming apparatus 100 and the two power receiving apparatuses 120 with the power receiving apparatus IDs "AA" and "BB" is described with reference to FIG. 8. First, in the image forming apparatus 100, the CPU 104 performs broadcast communications through the wireless power supply unit 102 to notify the power receiving apparatuses 120 of the power supply start in step S501. Next, the CPU 104 determines whether the association period is over in step S502.

The processing proceeds to step S503 when the CPU 104 determines that the association period is not over in step S502. The processing is terminated when the CPU 104 determines that the association period is over in step S502. In step S503, the CPU 104 determines whether a power receiving request notification ID has been received from the power receiving apparatus 120. The power receiving request notification ID is information including a power supply request from the power receiving apparatus 120 and the power receiving apparatus ID of the power receiving apparatus 120 requesting the power supply.

The processing returns to step S502 if the CPU 104 determines that the power receiving request notification ID has not been received from the power receiving apparatus 120 in step S503. The processing proceeds to step S504 if the CPU 104 determines that the power receiving request notification ID has been received from the power receiving apparatus 120 in step S503.

In step S504, the CPU 104 creates the power receiving apparatus information table based on the power receiving request notification ID received from the power receiving apparatus 120 in step S503. The CPU 104 stores the power receiving apparatus information table thus created in the RAM 105. Specifically, the CPU 104 stores the power receiving apparatus ID indicated by the power receiving request notification ID in the power receiving apparatus ID 8010. The CPU 104 allocates a serial number to the power receiving apparatus ID stored based on the power receiving request notification ID, and stores the allocated serial number in the serial number 8000.

In step S505, the CPU 104 transmits the power receiving apparatus ID indicated by the power receiving request notification ID received in step S503 to all the power receiving apparatuses 120 capable of performing communications through the wireless transmitting and receiving unit 101, and then the processing returns to step S502. The communications between the image forming apparatus 100 and the power receiving apparatus 120 are completed when the operation in step S505 is completed. Thus, the image forming apparatus 100 can communicate with another power receiving apparatus 120.

The processing performed by the power receiving apparatus 120 with the power receiving apparatus ID "AA" in the association period will be described. In step S511, the CPU 210 of the power receiving apparatus 120 receives the power supply start notified from the image forming apparatus 100. In step S512, the CPU 210 determines whether the own apparatus is in a transmission standby state. Specifically, the CPU 210 determines whether the image forming apparatus 100 is communicating with another power receiving apparatus 120.

The processing proceeds to step S516 when the CPU 210 determines that the own apparatus is in the transmission standby state in step S512. The processing proceeds to step S513 when the CPU 210 determines that the own apparatus is not in the transmission standby state in step S512.

A case where the power receiving apparatus 120 with the power receiving apparatus ID "AA" is communicating with the image forming apparatus 100 in step S512 will be described. Here, the power receiving apparatus 120 different from that with the power receiving apparatus ID "AA" is in the transmission standby state. Thus, the power receiving apparatus 120 with the power receiving apparatus ID "BB" is in the transmission standby state. The power receiving apparatus 120 with the power receiving apparatus ID "BB" can communicate with the image forming apparatus 100 when the communications between the image forming apparatus 100 and the power receiving apparatus 120 with the power receiving apparatus ID "AA" are completed and if the image forming apparatus 100 is not communicating with still another power receiving apparatus 120.

In step S513, the CPU 210 transmits, to the image forming apparatus 100, the power receiving request notification ID including the power receiving request and the power receiving apparatus ID of the own apparatus. Thus, the image forming apparatus 100 receives the power receiving request notification ID in step S503. Then, in step S514, the CPU 210 receives the power receiving apparatus ID transmitted from the image forming apparatus 100 in step S505.

In step S515, the CPU 210 determines whether the power receiving apparatus ID received in step S514 is the power receiving apparatus ID of the own apparatus. The processing is terminated when the CPU 210 determines that the received power receiving apparatus ID is the power receiving apparatus ID of the own apparatus in step S515. The processing proceeds to step S518 when the CPU 210 determines that the received power receiving apparatus ID is not the power receiving apparatus ID of the own apparatus in step S515.

If the association period is over in step S518, the processing returns to step S511 where the power receiving apparatus 120 waits for the broadcast communication from the image forming apparatus 100. The processing returns to step S514 if the association period is not over in step S518.

In step S516, the CPU 210 determines whether the power receiving apparatus ID has been received from the image forming apparatus 100. This power receiving apparatus ID is the power receiving apparatus ID of the power receiving apparatus 120 requesting the power supply and transmitted from the image forming apparatus 100 in step S505. The processing proceeds to step S517 when the CPU 210 determines that the power receiving apparatus ID has been received in step S516. The CPU 210 keeps performing the operation in step S516 until the power receiving apparatus ID is received, when the CPU 210 determines that the power receiving apparatus ID has not been received in step S516.

In step S517, the CPU 210 determines whether the association period is over. The processing returns to step S511 when the CPU 210 determines that the association period is over in step S517, and proceeds to step S512 when the CPU 210 determines that the association period is not over in step S517. Specifically, the CPU 210 determines whether the image forming apparatus 100 is communicating with another power receiving apparatus 120. The CPU 210 transmits the own power receiving request notification ID if the own apparatus is not in the transmission standby state, and thus the processing in the association period is completed.

The processing (steps S521 to S528) performed by the power receiving apparatus 120 with the power receiving apparatus ID "BB" in the association period is similar to the processing (steps S511 to S518) performed by the power receiving apparatus 120 with the power receiving apparatus ID "AA" in the association period.

FIG. 9 is a flowchart illustrating the processing in the transfer preparation period in detail. In step S601, the CPU 104 of the image forming apparatus 100 reads out one power receiving apparatus ID from the power receiving apparatus information table stored in the RAM 105. Specifically, the CPU 104 reads out the power receiving apparatus ID stored without being associated with the remaining battery capacity 8020, the charging mode 8030, and the power transfer period for power receiving apparatus 8040 in the power receiving apparatus information table.

In step S602, the CPU 104 transmits the power receiving apparatus information request including the power receiving apparatus ID thus readout to the power receiving apparatus 120 through the wireless transmitting and receiving unit 101. Here, the power receiving apparatus information request is transmitted only to the power receiving apparatus 120 identified by the power receiving apparatus ID. For example, the power receiving apparatus information request for the power receiving apparatus 120 with the power receiving apparatus ID "AA" is transmitted to the power receiving apparatus 120 with the power receiving apparatus ID "AA" only.

In step S602, the CPU 104 transmits the power receiving apparatus information request including the power receiving apparatus ID "AA" to the power receiving apparatus 120 with the power receiving apparatus ID "AA" through the wireless transmitting and receiving unit 101. Thus, the power receiving apparatus 120 with the power receiving apparatus ID "AA" receives the power receiving apparatus information request in step S611. Also in step S602, the CPU 104 of the image forming apparatus 100 transmits the power receiving apparatus information request including the power receiving apparatus ID "BB" to the power receiving apparatus 120 with the power receiving apparatus ID "BB". Thus, the power receiving apparatus 120 with the power receiving apparatus ID "BB" receives the power receiving apparatus information request in step S621.

The power receiving apparatus 120 with the power receiving apparatus ID "BB" receives the power receiving apparatus information request after the communications between the image forming apparatus 100 and the power receiving apparatus 120 with the power receiving apparatus ID "AA" are completed. As described above, the image forming apparatus 100 communicates with the power receiving apparatuses 120 one by one in the transfer preparation period.

In step S611, the power receiving apparatus 120 with the power receiving apparatus ID "AA" receives the power receiving apparatus information request. Then, in step S612, the power receiving apparatus 120 with the power receiving apparatus ID "AA" transmits the own power receiving apparatus information to the image forming apparatus 100. Similarly, in step S621, the power receiving apparatus 120 with the power receiving apparatus ID "BB" receives the power receiving apparatus information request from the image forming apparatus 100, and transmits the own power receiving apparatus information to the image forming apparatus 100 in step S622. Thus, the processing performed by the power receiving apparatuses 120 in the transfer preparation period is completed.

In step S603, the CPU 104 of the image forming apparatus 100 receives the power receiving apparatus information from the power receiving apparatus 120 as a source of the power receiving apparatus information through the wireless transmitting and receiving unit 101. In the example illustrated in FIG. 9, the CPU 104 receives the power receiving apparatus information from each of the power receiving apparatuses 120 with the power receiving apparatus ID "AA" and with the power receiving apparatus ID "BB" in step S603. The power receiving apparatus information includes charging mode information and remaining battery capacity information. In other words, the processing in step S603 is an example of charging mode information receiving processing and remaining battery capacity information receiving processing.

In step S604, the CPU 104 of the image forming apparatus 100 stores the power receiving apparatus information received from each of the power receiving apparatuses 120 in the RAM 105. Specifically, the CPU 104 associates the remaining battery capacity and the charging mode in the power receiving apparatus information with the power receiving apparatus ID of the power receiving apparatus as the source of the power receiving apparatus information, and stores the remaining battery capacity and the charging mode in the power receiving apparatus information table illustrated in FIG. 7. The power receiving apparatus information table is created by the CPU 104 in step S504 in the association period described above with reference to FIG. 8.

In step S605, the CPU 104 determines whether the power receiving apparatus information has been received from all the power receiving apparatuses 120 which transmitted the power receiving request notification ID, that is, all the power receiving apparatuses 120 as the power supply targets. The processing proceeds to step S606 when the CPU 104 determines that the power receiving apparatus information has been received from all the target power receiving apparatuses 120 in step S605. The processing returns to step S601 when the CPU 104 determines that the power receiving apparatus information has not been received from all the target power receiving apparatuses 120 in step S605.

In step S606, the CPU 104 determines the power transfer period, that is, the power supply time for each of the target power receiving apparatuses 120. The CPU 104 stores the power transfer period for the respective power receiving apparatuses thus determined in the power receiving apparatus information table, thereby completing the power receiving apparatus information table. The processing in step S606 is an example of power supply time determination processing.

A value of the power transfer period for power receiving apparatus is determined by the charging mode. The RAM 105 of the image forming apparatus 100 stores the power transfer period for a power receiving apparatus corresponding to each charging mode in advance. The CPU 104 refers to the information and specifies the power transfer period for a power receiving apparatus corresponding to the charging mode associated with the power receiving apparatus ID of each power receiving apparatus 120. The CPU 104 stores in the power receiving apparatus information table the specified value in association with the power receiving apparatus ID of the power receiving apparatus as the source of the power receiving apparatus information.

For example, it is assumed that first and second times of the power transfer period for a power receiving apparatus are respectively determined for the normal charging and the fast charging. The second time is longer than the first time. In the exemplary embodiment, the first time is 60 seconds and the second time is 300 seconds. Here, the CPU 104 determines the power transfer period of the power receiving apparatus 120 requesting the normal charging to be 60 seconds, and determines the power transfer period of the power receiving apparatus 120 requesting the fast charging to be 300 seconds. Thus, as illustrated in FIG. 7, the power transfer period for a power receiving apparatus of 60 seconds is associated with the normal charging mode (value of the charging mode flag is 0) and stored. The power transfer period for a power receiving apparatus of 300 seconds is associated with the fast charging mode (value of the charging mode flag is 1) and stored.

The user inputs and sets the value of the power transfer period for a power receiving apparatus for each charging mode. How the image forming apparatus 100 sets the power transfer period for a power receiving apparatus in accordance with a user input will be described below with reference to FIG. 16.

When the power receiving apparatus information table is completed through the processing described above, the CPU 104 of the image forming apparatus 100 creates a power supply order table from the power receiving apparatus information table. Now, the power supply order table will be described. FIG. 10 is a diagram illustrating an example of the power supply order table. The power supply order table includes a serial number 9000, a power receiving apparatus ID 9010, a remaining battery capacity 9020, a charging mode 9030, a power transfer period for power receiving apparatus 9040, and a skip 9050. The CPU 104 sorts the records in the power receiving apparatus information table in a power supply order to create the power supply order table.

Values of the power receiving apparatus ID 9010 and the remaining battery capacity 9020 in the power supply order table are the same as the respective values of the power receiving apparatus ID 8010 and the remaining battery capacity 8020 in the power receiving apparatus information table. Values of the charging mode 9030 and the power transfer period for power receiving apparatus 9040 in the power supply order table are the same as the respective values of the charging mode 8030 and the power transfer period for power receiving apparatus 8040 in the power receiving apparatus information table.

The serial number 9000 is information indicating the power supply order determined by the CPU 104. The image forming apparatus 100 supplies power to the power receiving apparatuses 120 in the order of the serial number 9000. The skip 9050 is information indicating a case where the power supply is not performed in the power supply order determined by the serial number 9000.

In the exemplary embodiment, the image forming apparatus 100 supplies power to the power receiving apparatus 120 associated with the information "No" in the skip 9050 in the power supply order. On the other hand, the image forming apparatus 100 does not supply power to the power receiving apparatus 120 associated with the information "Yes" in the skip 9050 in the power supply order, and instead supplies power to the one next in the power supply order. The CPU 104 stores the skip 9050 in the power supply order table in step S811 in FIG. 11.

Now, information used by the CPU 104 of the image forming apparatus 100 to create the power supply order table will be described. The image forming apparatus 100 stores the length of the power transfer period of a single frame in a super frame, power order setting information, and priority information in advance. The CPU 104 creates the power supply order table based on the length of a single frame in a super frame, the power order setting information, the priority information, and the power receiving apparatus information table stored in the RAM 105. The length of a single frame in a super frame, the power order setting information, and the priority information are information respectively input and set by the user. How the setting is made with information input from the user will be described below.

Here, the length of the power transfer period of a single frame is the length of the power transfer period 430 in the single super frame N400 illustrated in FIG. 5. As illustrated in FIG. 5, if the power is transferred to a plurality of the power receiving apparatuses 120 in the power transfer period 430, the length of the power transfer period of a single frame is the sum of the power transfer periods for the respective power receiving apparatuses 120.

The power supply order information indicates a reference condition for determining the power supply order. In the image forming apparatus 100 of the exemplary embodiment, any one of a detected order, an ascending order of the remaining battery capacity, and a descending order of the remaining battery capacity is set as the power supply order setting information. When the detected order is set, the power supply proceeds in the order in which the power receiving apparatuses 120 are detected by the image forming apparatus 100. In other words, the serial number 8000 in the power receiving apparatus information table is set as the power supply order. When the ascending order of the remaining battery capacity is set, the power supply starts from the one with the smallest remaining battery capacity, and thus the power supply order is set to be the ascending order of the remaining battery capacity. When the descending order of the remaining battery capacity is set, the power supply starts from the one with the largest remaining battery capacity, and thus the power supply order is set to be the descending order.

Priority setting information is information indicating a condition of the charging mode having priority over the power supply order. In the image forming apparatus 100 of the exemplary embodiment, any one of a fast charging priority, a normal charging priority, and a balanced charging is set as the priority information. When the fast charging priority is set, the power receiving apparatus 120 requesting the fast charging comes earlier in the power supply order than that requesting the normal charging. When the normal charging priority is set, the power receiving apparatus 120 requesting the normal charging comes earlier in the power supply order than that requesting the fast charging. When the balanced charging is set, a supplied order is set in which the power receiving apparatuses 120 requesting the normal charging and the power receiving apparatuses 120 requesting the fast charging receive the power supply in a balanced manner.

Figure 11:
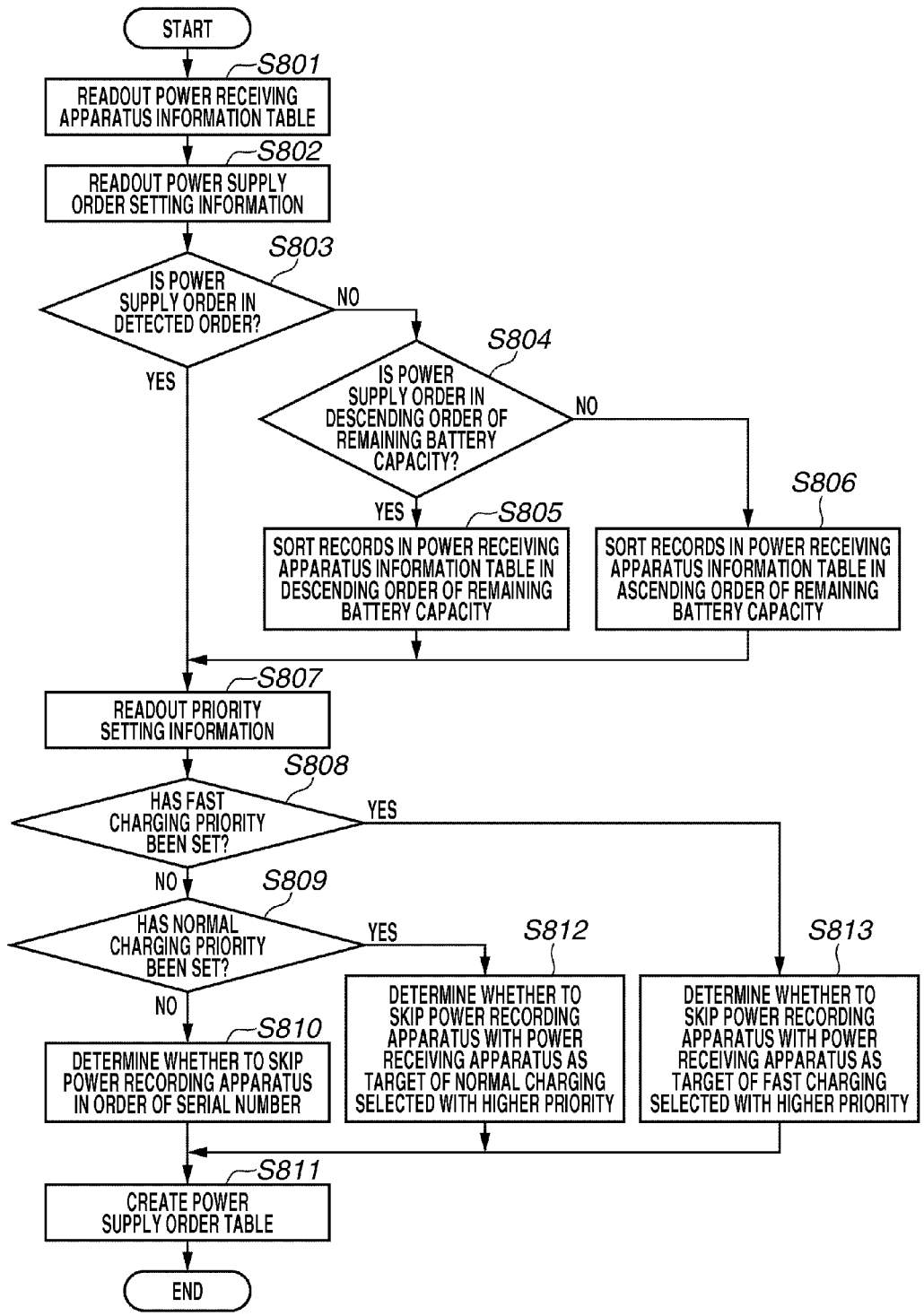
FIG. 11 is a flowchart illustrating power supply order table creating processing.

FIG. 11 is a flowchart illustrating power supply order table creating processing performed by the image forming apparatus 100. The CPU 104 of the image forming apparatus 100 refers to the power supply order table in the processing in the power transfer period described with reference to FIG. 12. In step S801, the CPU 104 reads out the power receiving apparatus information table stored in the RAM 105. Then, in step S802, the CPU 104 reads out the power supply order setting information stored in the RAM 105.

In step S803, the CPU 104 specifies the condition for determining the power supply order indicated by the power supply order setting information readout in step S802. The processing proceeds to step S807 when the CPU 104 specifies the detected order as the condition in step S803. The processing proceeds to step S804 when the CPU 104 does not specify the detected order as the condition, and instead specifies the descending order of the remaining battery capacity or the ascending order of the remaining battery capacity as the condition in step S803.

The processing proceeds to step S805 when the CPU 104 specifies the descending order of the remaining battery capacity as the condition in step S804. The processing proceeds to step S806 when the CPU 104 does not specify the descending order of the remaining battery capacity as the condition, and thus specifies the ascending order of the remaining battery capacity instead as the condition in step S804.

In step S805, the CPU 104 sorts the records stored in the power receiving apparatus information table so that the one with the largest remaining battery capacity comes first, that is, in the descending order of the remaining battery capacity. Here, a single record in the power receiving apparatus information table includes the power receiving apparatus ID 8010, the remaining battery capacity 8020, the charging mode 8030, and the power transfer period for power receiving apparatus 8040 associated with one power receiving apparatus 120.

In step S806, the CPU 104 sorts the records stored in the power receiving apparatus information table so that the one with the smallest remaining battery capacity comes first, that is, in the ascending order of the remaining battery capacity. Through the processing described above, the CPU 104 updates the power receiving apparatus information table by sorting the records in the power receiving apparatus information table when the descending order of the remaining battery capacity or the ascending order of the remaining battery capacity is set as the condition.

Then, in step S807, the CPU 104 reads out the priority setting information stored in the RAM 105. In step S808, the CPU 104 specifies the condition having a priority over the power supply order indicated by the priority setting information readout in step S807. The processing proceeds to step S813 when the CPU 104 specifies the fast charging priority as the condition in step S808. The processing proceeds to step S809 when the CPU 104 does not specify the fast charging priority as the condition, and instead specifies the normal charging priority or the balanced charging in step S808.

The processing proceeds to step S812 when the CPU 104 specifies the normal charging priority as the condition in step S809. The processing proceeds to step S810 when the CPU 104 does not specify the normal charging priority as the condition, and instead specifies the balanced charging as the condition in step S809.

In step S810, the CPU 104 determines whether the power receiving apparatuses 120 respectively corresponding to the records in the power receiving apparatus information table are to be skipped. Specifically, the CPU 104 selects the power receiving apparatuses 120 as power supply target candidates one by one in the order of the serial number 9000. Then, the CPU 104 determines whether the selected power receiving apparatus 120 is to be the power supply target, that is, whether the selected power receiving apparatus 120 is not to be skipped based on the power transfer period of a single frame and the power transfer period for a power receiving apparatus in the power receiving apparatus information table. The power receiving apparatus 120 to be skipped is not set to be the power supply target, and the power receiving apparatus 120 not to be skipped is set to be the power supply target.

Processing in a case is described where the power transfer period of a single frame is set to 600 seconds, and the power transfer periods of power receiving apparatus of the fast charging and the normal charging are respectively set to 300 seconds and 60 seconds.

Here, the CPU 104 determines the number of the power receiving apparatuses 120 as the fast charging power supply targets and the number of the power receiving apparatuses 120 as the normal charging power supply targets in a single frame in such a manner that the following Formula 1 is satisfied:

(Total time of power transfer period)≥(the number of power receiving apparatuses as fast charging targets)×(power transfer period for power receiving apparatuses as fast charging targets)+(the number of power receiving apparatuses as normal charging targets)×(power transfer period for power receiving apparatuses as normal charging targets)   (Formula 1)

In the balanced charging, the CPU 104 determines the power receiving apparatuses 120 as the power supply targets in the order of the serial number 9000. In the example illustrated in FIG. 10, the total power transfer period for power receiving apparatuses is 480 seconds when the power receiving apparatuses 120 of which the serial numbers 9000 are "1" to "4" are set as the power supply targets. If the power receiving apparatus 120 of which the serial number 9000 is "5" is further set as the power supply target, the total power transfer period for power receiving apparatuses is 780 seconds, which exceeds the setting value 600 of the power transfer period of a single frame. Therefore, the CPU 104 determines not to set the power receiving apparatus 120 of which the serial number 9000 is "5" (the power receiving apparatus 120 with the power receiving apparatus ID "JJ") as the power supply target.

In other words, the CPU 104 determines to skip the power receiving apparatus 120 of which the serial number 9000 is "5". The CPU 104 performs the similar processing on the other records, and thus determines to skip the power receiving apparatuses 120 of which the serial numbers 9000 are "6" and "9".

In step S811, the CPU 104 creates the power supply order table based on the power receiving apparatus information table and the result of the determination of whether to perform the skipping in step S810. Specifically, the CPU 104 provides information indicating whether to perform the skipping determined in step S810, S812, or S813 to each of the records in the power receiving apparatus information table. Thus, the power supply order table is obtained.

In step S812, the CPU 104 determines whether to skip the power receiving apparatus 120 corresponding to each record in the power receiving apparatus table based on the normal charging priority setting. Specifically, the CPU 104 selects the power receiving apparatus 120 as the normal charging target with a priority over the serial number 9000. Then, the CPU 104 determines whether to skip the selected power receiving apparatus 120 based on the power transfer period of a single frame and the power transfer period for a power receiving apparatus in the power receiving apparatus information table.

In step S813, the CPU 104 determines whether to skip the power receiving apparatus 120 corresponding to each record in the power receiving apparatus table based on the fast charging priority setting. Specifically, the CPU 104 selects the power receiving apparatus 120 as the fast charging target with a priority over the serial number 9000. Then, the CPU 104 determines whether to skip the selected power receiving apparatus 120 based on the power transfer period of a single frame and the power transfer period for a power receiving apparatus in the power receiving apparatus information table.

The power supply order table creating processing is an example of the power supply order determination processing. More specifically, the processing in steps S808 to S813 and the processing in steps S805 and S806 are examples of the power supply order determination processing.

Figure 12:
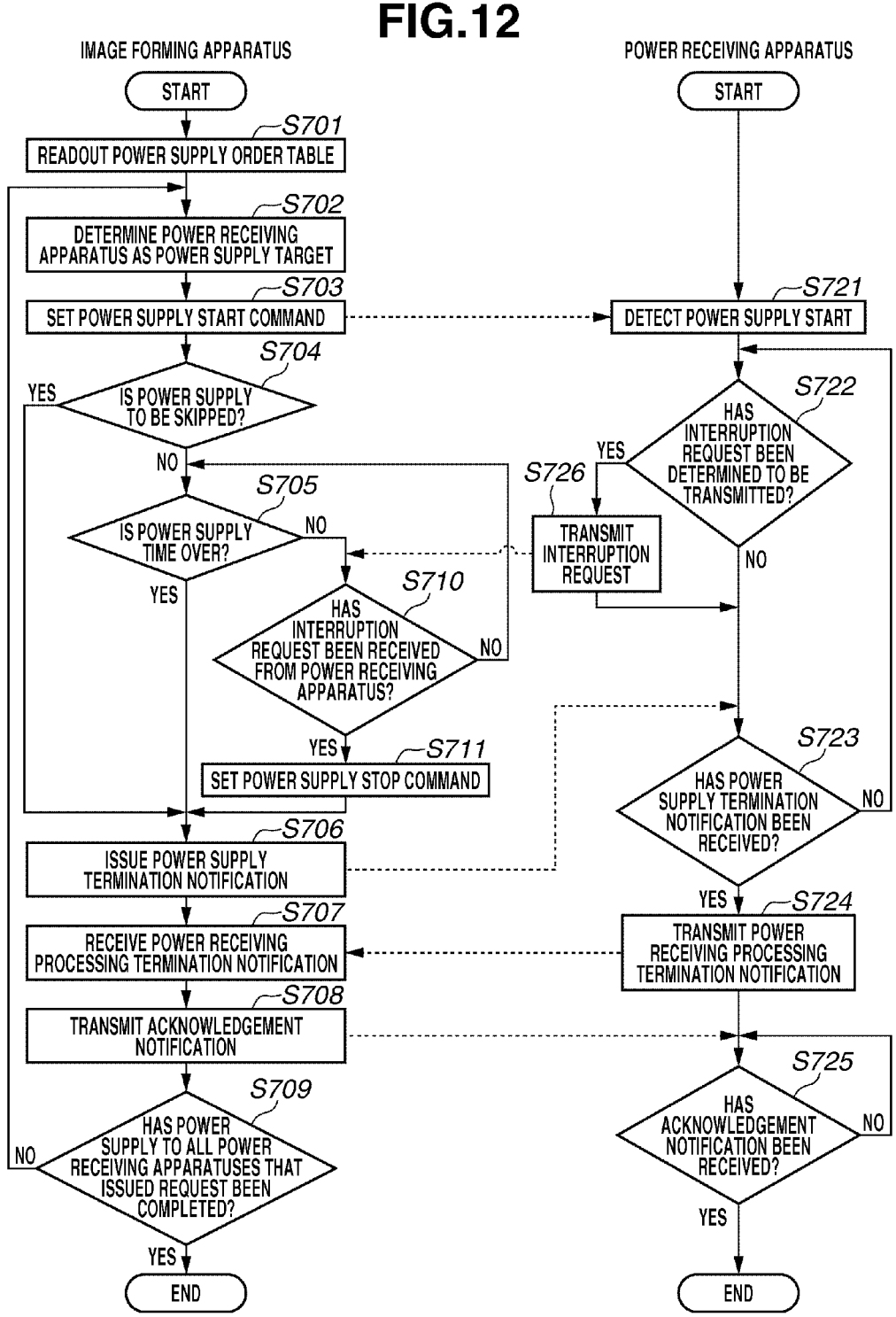
FIG. 12 is a flowchart illustrating processing in a power transfer period.

FIG. 12 is a flowchart illustrating the processing in the power transfer period in detail. First, in step S701, the CPU 104 reads out the power supply order table (FIG. 10) stored in the RAM 105. Next, in step S702, the CPU 104 determines the power receiving apparatuses 120 as the power supply targets based on the power supply order table readout in step S701. Specifically, the CPU 104 determines the power receiving apparatuses 120 as the power supply targets in the ascending order of the serial number 9000 in the power supply order table.

Then, in step S703, the CPU 104 sets the power supply start command including the power receiving apparatus ID and the power supply time (power transfer period for power receiving apparatus 9040) of the power receiving apparatus 120 determined in step S702 in the wireless transmitting and receiving unit 101. The wireless transmitting and receiving unit 101 transmits the power supply start command to the power receiving apparatus 120 identified by the power receiving apparatus ID included in the power supply start command. Further, the CPU 104 sets the power supply time of the wireless power supply unit 102, and issues the power supply instruction (power supply control processing). Thus, the wireless power supply unit 102 performs the wireless power supply (power supply processing).

On the other hand, the wireless transmitting and receiving unit 200 of the power receiving apparatus 120 determined as the power supply target receives the power supply start command in step S721. The CPU 210 receives the power supply start command from the wireless transmitting and receiving unit 200. Then, the CPU 210 issues the power receiving instruction to the wireless power receiving unit 230. After receiving the power receiving instruction, the wireless power receiving unit 230 receives the power supply through the power receiving unit antenna 260 and stores power in the secondary battery 270.

In step S704, the CPU 104 of the image forming apparatus 100 determines whether the power receiving apparatus 120 determined as the power supply target in step S702 is to be skipped. Specifically, the CPU 104 determines whether to perform the skipping based on the skip 9050 of the record of the power receiving apparatus 120 determined as the power supply target in the power supply order table.

The processing proceeds to step S706 when the CPU 104 determines to skip the power receiving apparatus 120 in step S704. The processing proceeds to step S705 when the CPU 104 determines not to skip the power receiving apparatus 120 in step S704.

In step S705, the CPU 104 determines whether the power supply time is over. The processing proceeds to step S706 when the CPU 104 determines that the power supply time is over in step S705. The processing proceeds to step S710 when the CPU 104 determines that the power supply time is not over in step S705. In step S705, the CPU 104 detects that the power supply time is over from an interrupt signal output from the wireless power supply unit 102. Upon outputting the interrupt signal to the CPU 104, the wireless power supply unit 102 stops the power supply through the power supply antenna 114.

In step S722, the CPU 210 of the power receiving apparatus 120 determines whether to transmit a power supply interruption request to the image forming apparatus 100. The power supply interruption request is transmitted when a predetermined condition assumed to be set in the power receiving apparatus 120 in advance is satisfied, for example.

The processing proceeds to step S723 when the CPU 210 determines not to transmit the power supply interruption request in step S722. The CPU 210 repeats the processing in steps S722 and S723 until the power supply termination notification is received in step S723. The processing proceeds to step S726 when the CPU 210 determines to transmit the power supply interruption request in step S722. In step S726, the CPU 210 transmits the power supply interruption request to the image forming apparatus 100.

In step S710, the CPU 104 of the image forming apparatus 100 determines whether the wireless transmitting and receiving unit 101 has received the power supply interruption request from the power receiving apparatus 120. The processing proceeds to step S711 when the CPU 104 determines that the interruption request has been received in step S710. The processing returns to step S705 when the CPU 104 determines that the interruption request has not been received in step S710.

In step S711, the CPU 104 sets a power supply stop command to the wireless power supply unit 102, and thus stops the power supply through the power supply unit antenna 114. In step S723, the CPU 210 of the power receiving apparatus 120 waits for the power supply termination notification after transmitting the interruption request. As described above, the CPU 104 of the image forming apparatus 100 can appropriately stop the power supply in response to the interruption request from the power receiving apparatus 120.

In step S706, the CPU 104 issues the power supply termination notification to the power receiving apparatus 120 through the wireless transmitting and receiving unit 101. The processing proceeds to step S724 when the CPU 210 of the power receiving apparatus 120 receives the power supply termination notification in step S723. In step S724, the CPU 210 of the power receiving apparatus 120 transmits the power receiving processing termination notification to the image forming apparatus 100 through the wireless transmitting and receiving unit 200.

In step S707, the CPU 104 of the image forming apparatus 100 receives the power receiving processing termination notification transmitted from the power receiving apparatus 120 through the wireless transmitting and receiving unit 101. In step S708, the CPU 104 transmits the acknowledgement notification indicating that the power receiving processing termination notification has been received to the power receiving apparatus 120 through the wireless transmitting and receiving unit 101. In step S725, the CPU 210 of the power receiving apparatus 120 waits for the acknowledgement notification to be received from the image forming apparatus 100. The processing in the power transfer period is terminated when the CPU 210 receives the acknowledgement notification in step S725.

In step S709, the CPU 104 determines whether the processing has been completed for all the power receiving apparatuses 120 recorded in the power supply order table. The processing in the power transfer period is terminated when the CPU 104 determines that the processing has been completed for all the power receiving apparatuses 120 in step S709. The processing returns to step S702 when the CPU 104 determines that the processing has not been completed for all the power receiving apparatuses 120 in step S709. The processing then again proceeds with the unprocessed power receiving apparatus 120 determined as the power supply target by the CPU 104 in step S702.

Figure 13:
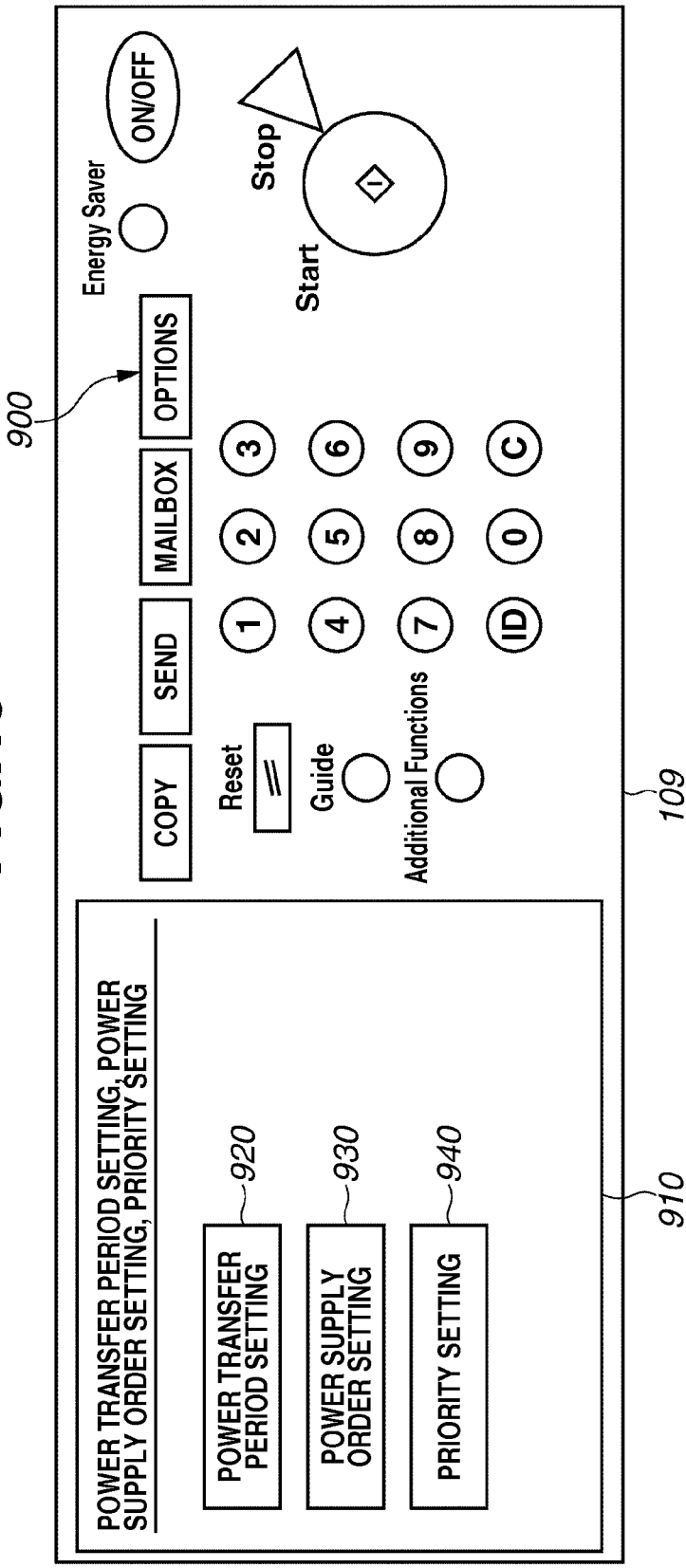
FIG. 13 is a diagram illustrating an example of a reception screen.

Now, processing of setting various pieces of information based on an input from the user in the image forming apparatus 100 will be described. FIG. 13 is a diagram illustrating an example of a reception screen for receiving various settings from the user. As illustrated in FIG. 13, the operation unit 109 includes the display unit 910 on which the reception screen is displayed.

In the reception screen, the user can select one of the power transfer period, the power supply order, and the priority to be set. In the reception screen, a power transfer period setting button 920, a power supply order setting button 930, and a priority setting button 940 are displayed. When the user operates a user operation button 900, the CPU 104 receives the operation input, and causes the display unit 910 to display the reception screen in accordance with the input.

Figure 14:
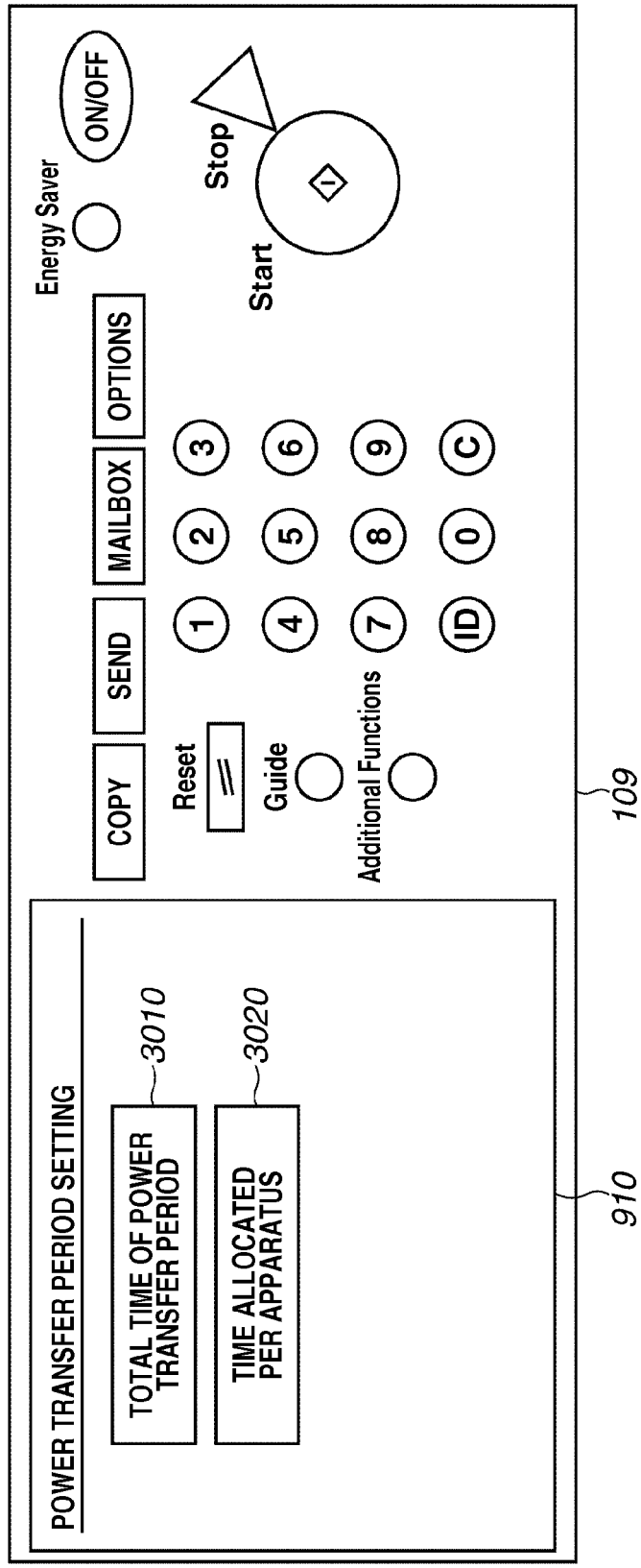
FIG. 14 is a diagram illustrating an example of a power transfer period setting screen.

Upon determining that the power transfer period setting button 920 in the reception screen is pressed, the CPU 104 changes the display on the display unit 910 from the reception screen to the power transfer period setting screen illustrated in FIG. 14. Upon determining that the power supply order setting button 930 in the reception screen is pressed, the CPU 104 changes the display on the display unit 910 from the reception screen to the power supply order setting screen illustrated in FIG. 17. Upon determining that the priority setting button 940 in the reception screen is pressed, the CPU 104 changes the display on the display unit 910 from the reception screen to the priority setting screen illustrated in FIG. 18.

Figure 15:
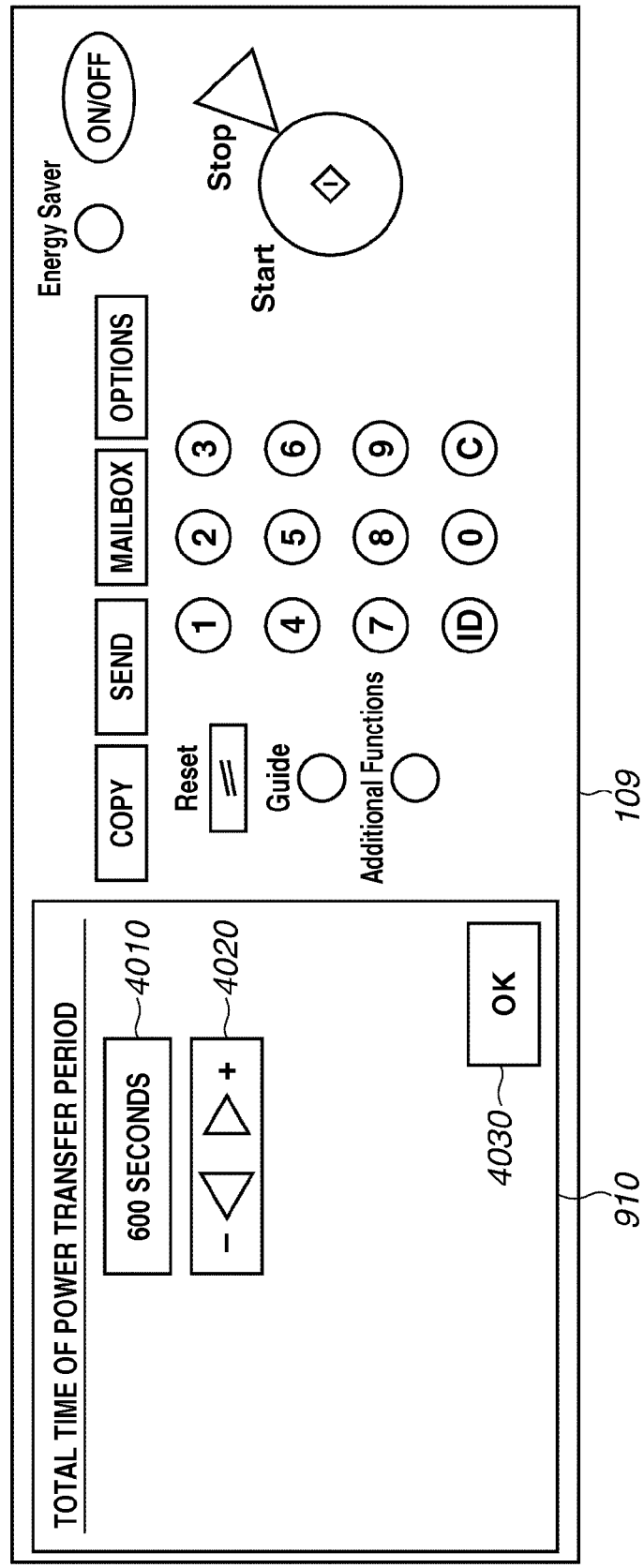
FIG. 15 is a diagram illustrating an example of a total time of power transfer period setting screen.

FIG. 14 is a diagram illustrating an example of the power transfer period setting screen displayed on the display unit 910. In the power transfer period setting screen, a total time of power transfer period button 3010 and a time allocated per apparatus button 3020 are displayed. Upon determining that the total time of power transfer period button 3010 in the reception screen is pressed, the CPU 104 changes the display on the display unit 910 from the power transfer period setting screen to a total time of power transfer period setting screen illustrated in FIG. 15. Upon determining that the time allocated per apparatus button 3020 in the reception screen is pressed, the CPU 104 changes the display on the display unit 910 from the power transfer period setting screen to a time allocated per apparatus setting screen illustrated in FIG. 16. FIG. 15 is a diagram illustrating an example of the total time of power transfer period setting screen displayed on the display unit 910. The total time of power transfer period setting screen is a screen for receiving an input for specifying the time of the power transfer period 430 in a single frame from the user. In the total time of power transfer period setting screen, a power transfer time box 4010, a time change button 4020, and an OK button 4030 are displayed. In the power transfer time box 4010, the power transfer period of a single frame is to be input. In the example illustrated in FIG. 15, 600 seconds is input.

The time change button 4020 is a button used to change the value in the power transfer time box 4010. The value displayed in the power transfer time box 4010 decreases when a triangular button on a minus side of the time change button 4020 is pressed. The value displayed in the power transfer time box 4010 increases when a triangular button on a plus side of the time change button 4020 is pressed. When the OK button 4030 is pressed, the CPU 104 stores the time input in the power transfer time box 4010 in the RAM 105 as the length of the power transfer period in a single frame.

Figure 16:
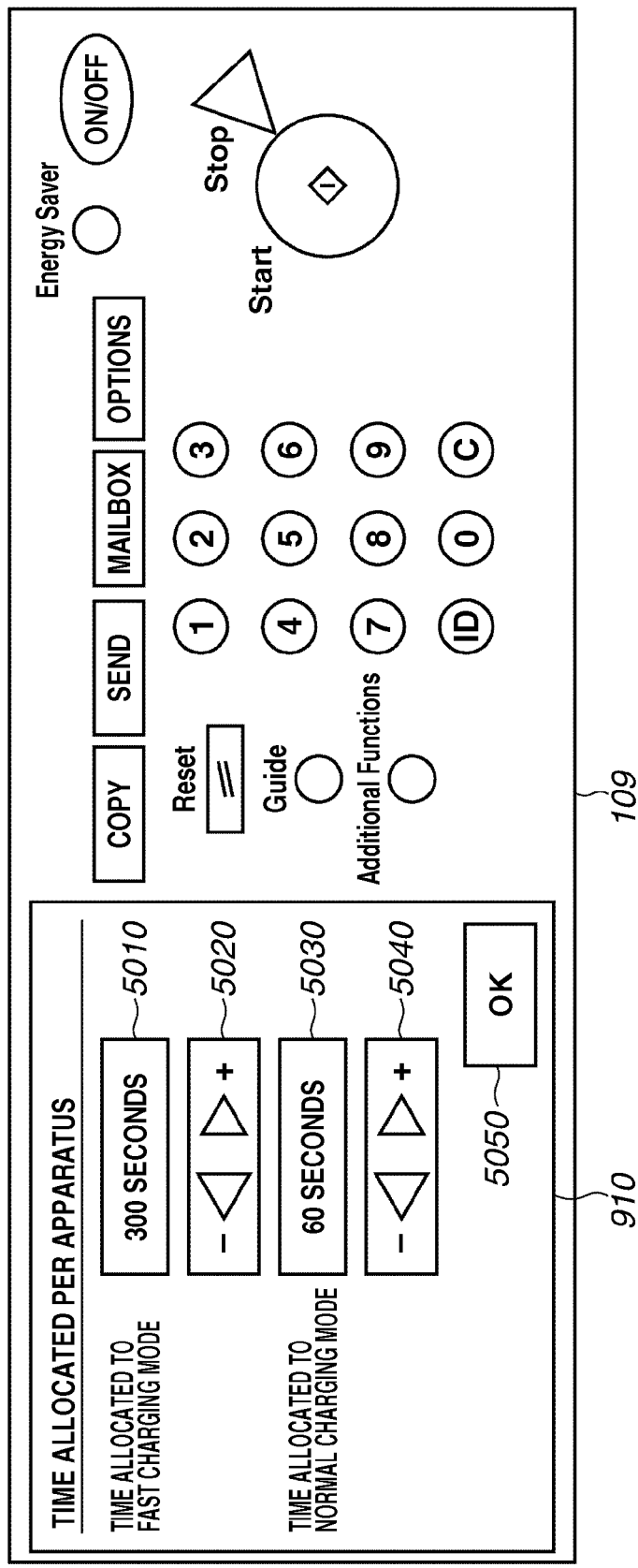
FIG. 16 is a diagram illustrating an example of a time allocated per apparatus setting screen.

FIG. 16 is a diagram illustrating an example of the time allocated per apparatus setting screen displayed on the display unit 910. The time allocated per apparatus setting screen is a screen for receiving a user input for allocating a power transfer period to the power receiving apparatus 120 requesting the fast charging, and allocating a power transfer period to the power receiving apparatus 120 requesting the normal charging. In the time allocated per apparatus setting screen, a time allocated to fast charging mode box 5010, a time change button 5020, a time allocated to normal charging mode box 5030, a time change button 5040, and an OK button 5050 are displayed.

In the time allocated to fast charging mode box 5010, a time allocated per power receiving apparatus 120 requesting the fast charging mode is input. In the example illustrated in FIG. 16, 300 seconds is set. The time change button 5020 is a button used to change the value in the time allocated to fast charging mode box 5010. The value displayed in the time allocated to fast charging mode box 5010 decreases when a triangular button on a minus side of the time change button 5020 is pressed. The value displayed in the time allocated to fast charging mode box 5010 increases when a triangular button on a plus side of the time change button 5020 is pressed.

The setting value in the time allocated to normal charging mode box 5030 changes when the value in the time allocated to fast charging mode box 5010 changes. Specifically, the value in the time allocated to normal charging mode box 5030 changes in such a manner that the sum of the value set in the time allocated to fast charging mode box 5010 and the time allocated to normal charging mode box 5030 does not exceed the power transfer period of a single frame. More specifically, the value in the time allocated to normal charging mode box 5030 changes in such a manner that the time allocated to the fast charging becomes longer than the time allocated to the normal charging.

In the time allocated to normal charging mode box 5030, a time allocated per power receiving apparatus 120 requesting the normal charging mode is input. In the example illustrated in FIG. 16, 60 seconds is set. The time change button 5040 is a button used to change the value in the time allocated to normal charging mode box 5030. The value displayed in the time allocated to normal charging mode box 5030 decreases when a triangular button on a minus side of the time change button 5040 is pressed. The value displayed in the time allocated to normal charging mode box 5030 increases when a triangular button on a plus side of the time change button 5040 is pressed.

In this case also, values are set in such a manner that the sum of the value set in the time allocated to fast charging mode box 5010 and the value set in the time allocated to normal charging mode box 5030 does not exceed the power transfer period of a single frame.

When the OK button 5050 is pressed, the CPU 104 stores the time set in the time allocated per apparatus screen in the RAM 105. Specifically, the CPU 104 stores the value set in the time allocated to fast charging mode box 5010 in the RAM 105 as the power transfer period for the fast charging. The CPU 104 also stores the value set in the time allocated to normal charging mode box 5030 in the RAM 105 as the power transfer period for the normal charging.

When the display on the display unit 910 changes to the time allocated per apparatus screen, the value set in the power transfer time box 4010 may be set as the initial value in the time allocated to fast charging mode box 5010. Furthermore, the value in the time allocated to normal charging mode box 5030 may be set to "0".

Figure 17:
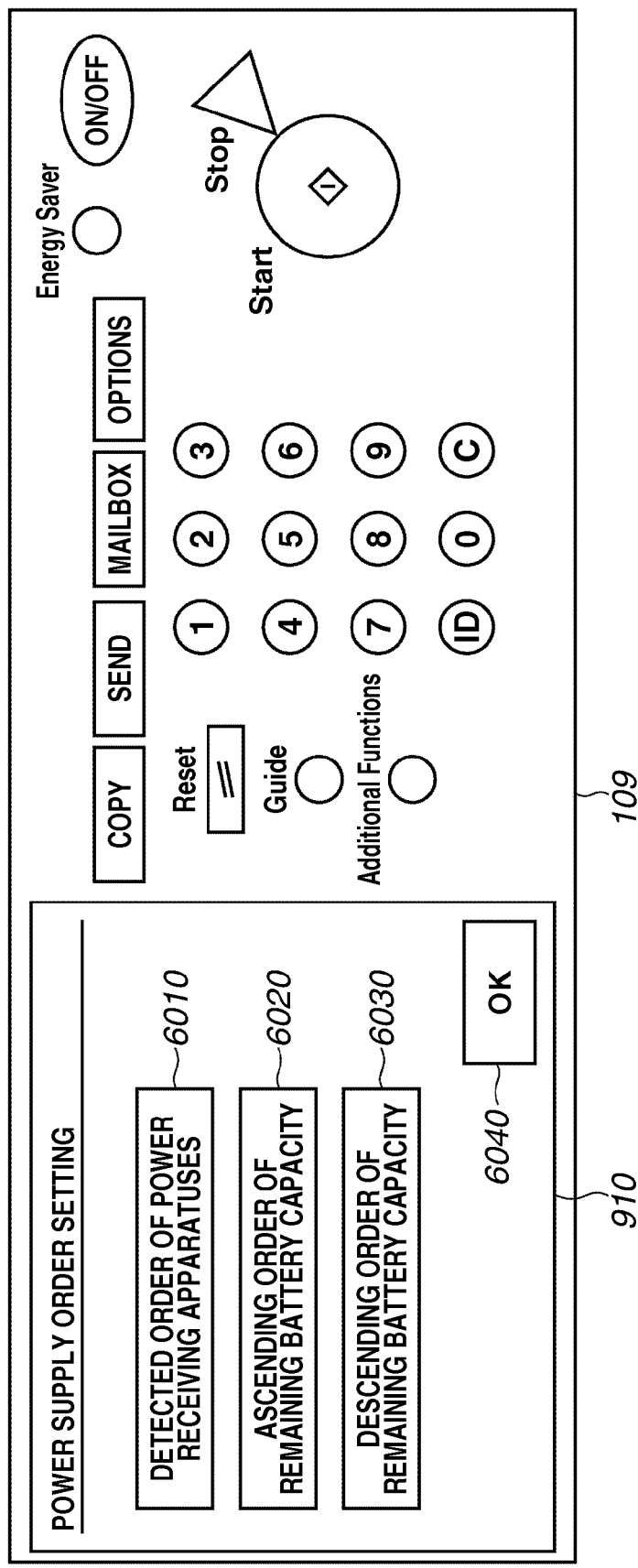
FIG. 17 is a diagram illustrating an example of a power supply order setting screen.

FIG. 17 is a diagram illustrating an example of the power supply order setting screen displayed on the display unit 910. In the power supply order setting screen, a detected order of power receiving apparatus button 6010, an ascending order or remaining battery capacity button 6020, a descending order or remaining battery capacity button 6030, and an OK button 6040 are displayed. A case is assumed where any one of the detected order of power receiving apparatus button 6010, the ascending order of remaining battery capacity button 6020, and the descending order of remaining battery capacity button 6030 is selected, and further the OK button 6040 is pressed by the user. Here, the CPU 104 stores the power supply order setting information corresponding to the selected power supply order setting in the RAM 105.

When the detected order of power receiving apparatus button 6010 is pressed, the CPU 104 stores the power supply order setting information in the detected order in the RAM 105. When the ascending order of remaining battery capacity button 6020 is pressed, the CPU 104 stores the power supply order setting information in the ascending order of remaining battery capacity in the RAM 105. When the descending order of remaining battery capacity button 6030 is pressed, the CPU 104 stores the power supply order setting information in the descending order of remaining battery capacity in the RAM 105.

Figure 18:
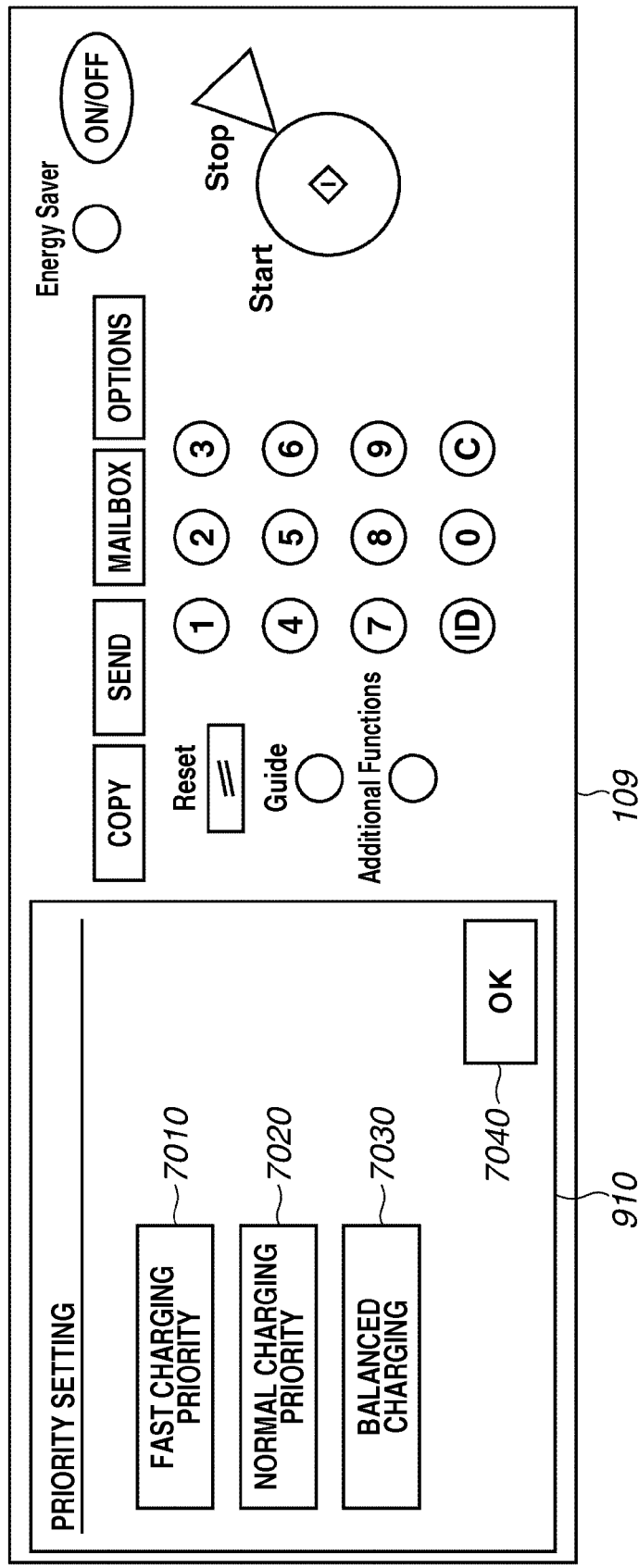
FIG. 18 is a diagram illustrating an example of a priority setting screen.

FIG. 18 a diagram illustrating an example of the priority setting screen displayed on the display unit 910. In the priority setting screen, a fast charging priority button 7010, a normal charging priority button 7020, a balanced charging button 7030, and an OK button 7040 are displayed. A case is assumed where any one of the fast charging priority button 7010, the normal charging priority button 7020, and the balanced charging button 7030 is selected, and further the OK button 7040 is pressed by the user. Here, the CPU 104 stores the priority setting information corresponding to the selected priority setting in the RAM 105.

When the fast charging priority button 7010 is pressed, the CPU 104 stores the priority setting information of the fast charging priority in the RAM 105. When the normal charging priority button 7020 is pressed, the CPU 104 stores the priority setting information of the normal charging priority in the RAM 105. When the balanced charging button 7030 is pressed, the CPU 104 stores the priority setting information of the balanced charging in the RAM 105.

As described above, the CPU 104 of the image forming apparatus 100 stores the power transfer period of a single frame, the power transfer period corresponding to each charging mode, the power supply order setting information, and the priority setting information in the RAM 105 based on the information input from the user with the content displayed on the display unit 910. The power supply order table creating processing (FIG. 11) is performed when the power transfer period of a single frame, the power transfer period corresponding to each charging mode, the power supply order setting information, and the priority setting information are stored in the RAM 105.

Therefore, in the wireless power supply system according to the exemplary embodiment, the image forming apparatus 100 can appropriately supply power in accordance with a charging mode requested by each power receiving apparatus 120.

As an alternative example, at least one of the power transfer period of a single frame, the power transfer period corresponding to each charging mode, the power supply order setting information, and the priority setting information may be stored in the RAM 105 in advance. As another alternative example, the user may be capable of changing the setting values stored in the RAM 105.

As yet another alternative example, the supplied power might be different between the power receiving apparatuses 120 requesting different charging modes. For example, the CPU 104 of the image forming apparatus 100 sets a first power as the supplied power to the power receiving apparatus 120 requesting the normal charging. The CPU 104 further sets a second power larger than the first power as the supplied power to the power receiving apparatus 120 requesting the fast charging (supplied power determination processing). Here, the CPU 104 sets the power supply time to be the same between the power receiving apparatuses 120 requesting different charging modes. As described above, the image forming apparatus 100 of this example can appropriately supply power in accordance with the requested charging mode by setting the power supply time to be the same and setting the supplied power to be different.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2013-021521 filed Feb. 6, 2013, which is hereby incorporated by reference herein in its entirety.

What is claimed is:

1. A power supply apparatus comprising:
   a wireless power supply unit configured to wirelessly supply power to an external device, wherein in a case where each of a plurality of external devices is a power supply target, the wireless power supply unit switches a power supply destination and supplies power in sequence;
   an acquisition unit configured to acquire, from the external device, mode information indicating whether the external device is in a first charging mode or a second charging mode different from the first charging mode
   a storing unit configured to store time information indicating a supply time corresponding to the first charging mode and a supply time corresponding to the second charging mode, wherein the supply time corresponding to the second charging mode is longer than the supply time corresponding to the first charging mode; and
   a specifying unit configured to specify a supply time for power supply to the external device based on the mode information acquired by the acquisition unit and the time information stored by the storing unit.

2. The power supply apparatus according to claim 1, wherein a user can change the supply time corresponding to the first charging mode and the supply time corresponding to the second charging mode.

3. The power supply apparatus according to claim 1, further comprising a display unit configured to display a setting screen for a user setting the supply time corresponding to the first charging mode and the supply time corresponding to the second charging mode.

4. The power supply apparatus according to claim 1, wherein in a case where the supply time specified by the specifying unit has passed, the wireless power supply unit switches the power supply destination to a next external device.

5. The power supply apparatus according to claim 1, wherein the power supply apparatus is an image forming apparatus that executes printing.

6. A method of supplying power from a power supply apparatus, the method comprising:
   wirelessly supplying power from the power supply apparatus to an external device, wherein in a case where each of a plurality of external devices is a power supply target, the wirelessly supplying power switches a power supply destination and supplies power in sequence;
   acquiring, from the external device, mode information indicating whether the external device is in a first charging mode or a second charging mode different from the first charging mode
   storing time information indicating a supply time corresponding to the first charging mode and a supply time corresponding to the second charging mode, wherein the supply time corresponding to the second charging mode is longer than the supply time corresponding to the first charging mode; and
   specifying a supply time for power supply to the external device based on the mode information acquired by the acquiring and the time information stored by the storing.

7. A non-transitory computer-readable storage medium that stores a program of instructions capable of causing a computer to perform a method of supplying power from a power supply apparatus, the method comprising:
   wirelessly supplying power from the power supply apparatus to an external device, wherein in a case where each of a plurality of external devices is a power supply target, the wirelessly supplying power switches a power supply destination and supplies power in sequence;
   acquiring, from the external device, mode information indicating whether the external device is in a first charging mode or a second charging mode different from the first charging mode
   storing time information indicating a supply time corresponding to the first charging mode and a supply time corresponding to the second charging mode, wherein the supply time corresponding to the second charging mode is longer than the supply time corresponding to the first charging mode; and
   specifying a supply time for power supply to the external device based on the mode information acquired by the acquiring and the time information stored by the storing.

* * * * *